United States Patent
Ueda

(10) Patent No.: US 12,028,602 B2
(45) Date of Patent: Jul. 2, 2024

(54) IMAGING APPARATUS AND CONTROL METHOD OF THE SAME

(71) Applicant: CANON KABUSHIKI KAISHA, Tokyo (JP)

(72) Inventor: Kiyoto Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/056,596

(22) Filed: Nov. 17, 2022

(65) Prior Publication Data
US 2023/0164425 A1 May 25, 2023

(30) Foreign Application Priority Data
Nov. 25, 2021 (JP) ................................ 2021-191534

(51) Int. Cl.
*H04N 23/62* (2023.01)
*H04N 23/667* (2023.01)
*H04N 23/67* (2023.01)

(52) U.S. Cl.
CPC ........... *H04N 23/62* (2023.01); *H04N 23/667* (2023.01); *H04N 23/675* (2023.01)

(58) Field of Classification Search
CPC .... H04N 23/62; H04N 23/631; H04N 23/667; H04N 23/675
USPC ....................................................... 348/345
See application file for complete search history.

(56) References Cited

U.S. PATENT DOCUMENTS

| | | | |
|---|---|---|---|
| 5,913,086 A | 6/1999 | Kawamura | |
| 9,002,317 B2* | 4/2015 | Hymowitz | H04M 11/04 455/404.1 |
| 9,386,438 B2* | 7/2016 | Hymowitz | H04M 11/04 |
| 10,652,442 B2* | 5/2020 | Furukawa | G06F 3/0488 |
| 10,685,088 B2* | 6/2020 | Ohashi | A61B 6/566 |
| 10,790,051 B2* | 9/2020 | Toyoda | G16H 10/60 |
| 11,165,964 B2* | 11/2021 | Ogawa | H04N 23/60 |
| 2007/0182846 A1 | 8/2007 | Uchida | |
| 2014/0087681 A1* | 3/2014 | Hymowitz | H04W 4/80 348/207.1 |
| 2015/0215758 A1* | 7/2015 | Hymowitz | H04M 11/04 455/404.2 |
| 2016/0078596 A1 | 3/2016 | Ohashi | |
| 2019/0014246 A1 | 1/2019 | Furukawa | |
| 2019/0260944 A1 | 8/2019 | Ogawa | |
| 2019/0341129 A1* | 11/2019 | Toyoda | G16H 10/60 |
| 2020/0005938 A1* | 1/2020 | Sloan | G16H 40/67 |

(Continued)

FOREIGN PATENT DOCUMENTS

| | | |
|---|---|---|
| JP | H08220582 A | 8/1996 |
| JP | 2012029056 A | 2/2012 |
| JP | 2019145984 A | 8/2019 |

*Primary Examiner* — Pritham D Prabhakher
(74) *Attorney, Agent, or Firm* — Canon U.S.A., Inc. IP Division

(57) ABSTRACT

An imaging apparatus includes an operation member, a setting unit configured to set the operation member to an enabled state or a disabled state a switching unit configured to switch an image capturing mode to a medical mode, and a control unit configured to perform, in a case where the image capturing mode is not the medical mode, control to allow the setting unit to set the operation member to the enabled state or the disabled state, and perform, in a case where the image capturing mode is the medical mode, control to set the operation member to the enabled state.

17 Claims, 21 Drawing Sheets

(56) References Cited

U.S. PATENT DOCUMENTS

| | | | |
|---|---|---|---|
| 2020/0066394 A1* | 2/2020 | Toyoda | G16H 10/60 |
| 2021/0267695 A1* | 9/2021 | Hazelton | A61B 1/00154 |
| 2021/0280300 A1* | 9/2021 | Hikosaka | A61B 6/00 |
| 2021/0282624 A1* | 9/2021 | Nichols | A61B 1/00059 |

* cited by examiner

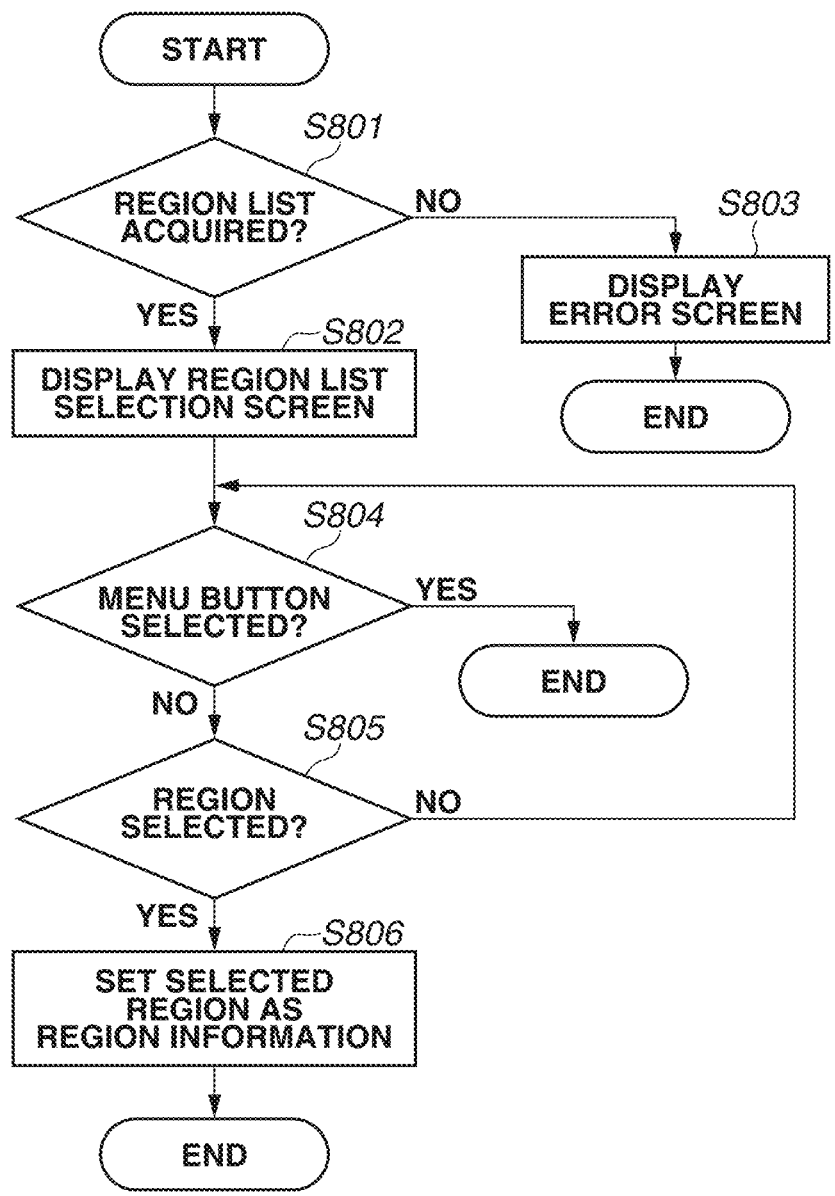

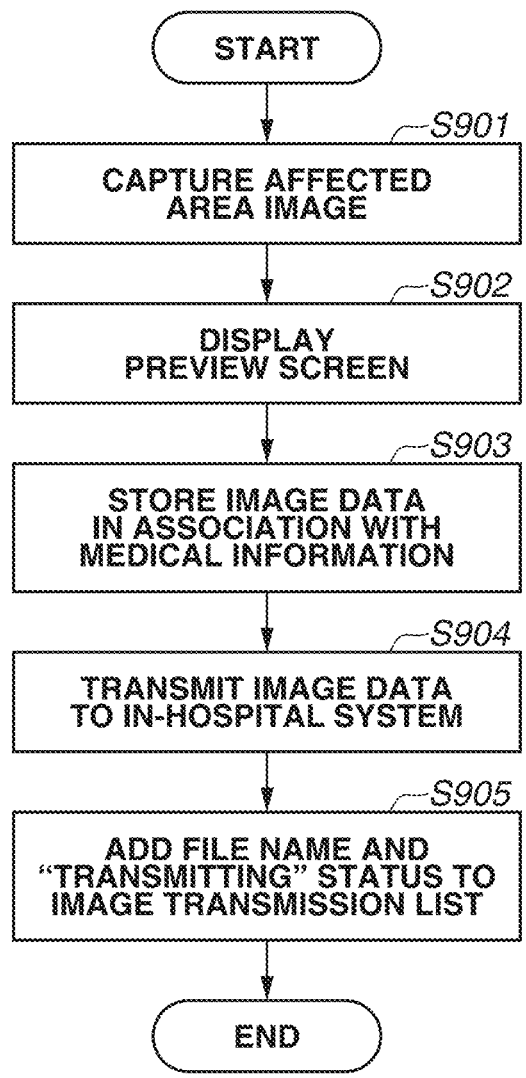

IMAGING APPARATUS AND CONTROL METHOD OF THE SAME

BACKGROUND OF THE INVENTION

Field of the Invention

A present invention relates to an imaging apparatus and a control method of an imaging apparatus.

Description of the Related Art

Some imaging apparatuses include a member in combination of an eight directional key and a center push button (multifunction controller) and a member in combination of an infrared detection member for detecting finger movements in eight directions and a center push button (smart controller), which are used to adjust a focus on a desired position, for example. Using such an operation member enables a user to swiftly select a subject to be focused. Touching a liquid crystal display also enables a user to bring a touched point into focus (touch autofocus (AF)).

While these operation members facilitate quick operations, the operation members have an issue that an erroneous operation is easily caused due to contact between the operation members or the liquid crystal display and a user's body when the imaging apparatus is put around the shoulder.

As a technique for preventing an erroneous operation, a lock function of an operation member has been proposed. Japanese Patent Application Laid-Open No. H8-220582 discusses a system having a disabled mode of an operation member. In the disabled mode, a function operable by one member is disabled, and a function operable by two members is enabled.

As for enhancement of operability, an imaging apparatus having a function that enables customization of a function of an operation member has also been proposed. Japanese Patent Application Laid-Open No. 2012-29056 discusses a technique with which custom modes are created and any function can be set for an operation member for each of the custom modes.

In a case where an imaging apparatus is used in a medical workplace, a user uses a camera without putting the camera around the shoulder. Thus, there is little possibility of an erroneous operation. Consequently, a lock function and an OFF setting for customization which are provided to prevent an erroneous operation are unnecessary settings and may disturb a smooth image capturing operation of the user instead.

SUMMARY OF THE INVENTION

The present invention is directed to an imaging apparatus in which a setting suitable for the use in a medical workplace can be set.

According to an aspect of the present invention, an imaging apparatus includes an operation member, a memory and at least one processor which function as a setting unit configured to set the operation member to an enabled state or a disabled state, a switching unit configured to switch an image capturing mode to a medical mode, and a control unit configured to perform, in a case where the image capturing mode is not the medical mode, control to allow the setting unit to set the operation member to the enabled state or the disabled state, and perform, in a case where the image capturing mode is the medical mode, control to set the operation member to the enabled state.

Further features of the present invention will become apparent from the following description of example embodiments with reference to the attached drawings.

BRIEF DESCRIPTION OF THE DRAWINGS

FIG. 8 is a flowchart of the region information acquisition processing.

FIG. 9 is a flowchart of affected area image capturing processing.

DESCRIPTION OF THE EMBODIMENTS

Hereinafter, an example embodiment of the present invention will be described with reference to the drawings.

<External View of Imaging Apparatus 100>

Figure 1A:
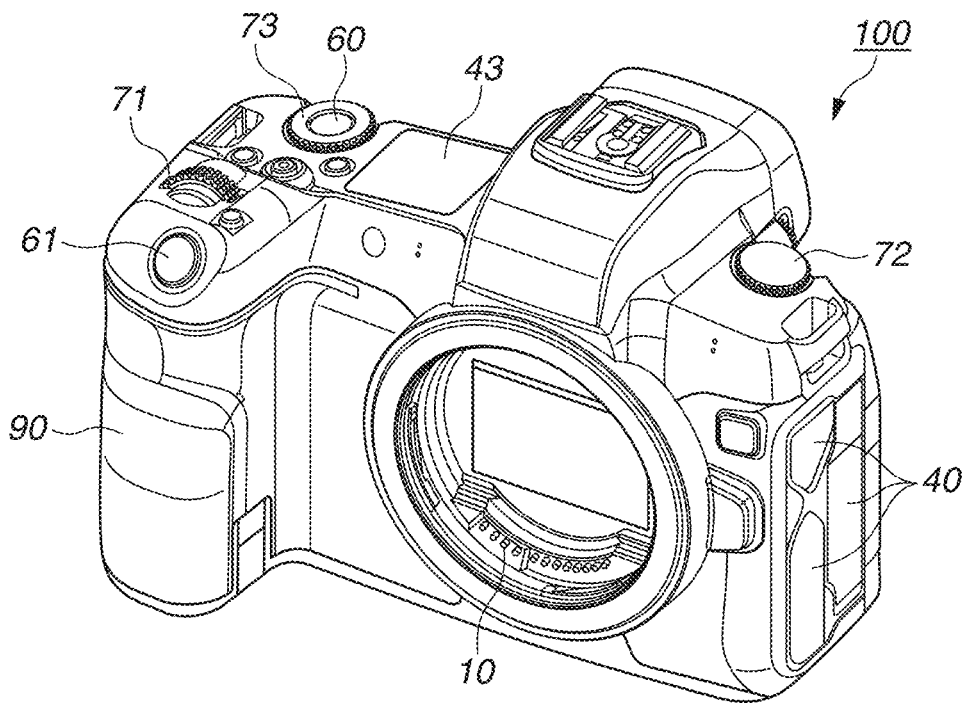
FIGS. 1A and 1B are external views of an imaging apparatus.
Figure 1B:
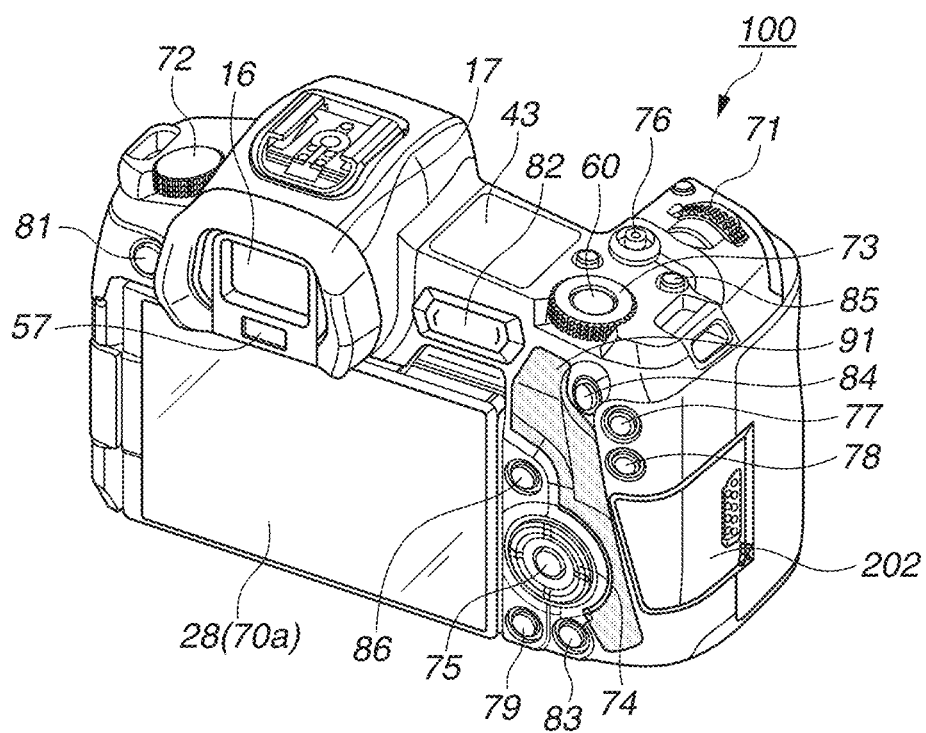

FIGS. 1A and 1B are external views of a digital camera (imaging apparatus) 100 serving as an example of an apparatus (electronic device) to which the present invention can be applied. FIG. 1A is a front side perspective view of the digital camera 100 and FIG. 1B is a back side perspective view of the digital camera 100.

A display unit 28 disposed on the back surface of the digital camera 100 displays images and various types of information. A touch panel 70a detects touch operations on a display surface (touch operation surface) of the display unit 28. A viewfinder external display unit 43 disposed on a top surface of the digital camera 100 displays various setting values, such as a shutter speed and an aperture value, of the digital camera 100. A shutter button 61 is an operation member for use in issuing an image capturing instruction. A mode selection switch 60 is an operation member for use in switching a mode between various modes. A terminal cover 40 protects a connector (not illustrated) for, for example, a connection cable that connects the digital camera 100 to an external device.

A main electronic dial 71 is a rotary operation member. A rotation operation on the main electronic dial 71 moves a selection frame (cursor) and changes setting values, such as a shutter speed and an aperture value, in accordance with a display state. A power switch 72 is an operation member for use in switching between ON and OFF of the power of the digital camera 100. A sub electronic dial 73 is a rotary operation member. A rotation operation on the sub electronic dial 73 moves a selection frame (cursor), changes setting values, such as a shutter speed and an aperture value, and feeds images, in accordance with a display state. A four directional key (cross key) 74 is an operation member which includes upper, lower, left, and right portions capable of being individually pressed, and an operation on the four directional key 74 moves a selection frame (cursor) and issues an execution instruction of processing corresponding to a pressed portion of the four directional key 74, in accordance with a display state. A SET button 75 is another example of an operation member and is a push button for mainly use in determination of a selected item.

Other examples of operation members, which may be buttons or keys, are described in the following. A movie button 76 is for use in issuing start and stop instructions of moving image capturing (recording). An autoexposure (AE) lock button 77 is a push button. A pressing operation on the AE lock button 77 in an imaging standby state fixes an exposure state. An enlargement button 78 is an operation button for use in switching between ON and OFF of an enlarged mode in live view display (LV display) in an image capturing mode. An operation on the main electronic dial 71 after the enlarged mode is turned ON enlarges or reduces a live view image (live image, LV image). In a reproduction mode, the enlargement button 78 functions as an operation button to enlarge a reproduced image and to increase an enlargement ratio of the reproduced image. A reproduction button 79 is an operation button for use in switching between the image capturing mode and the reproduction mode. A pressing operation on the reproduction button 79 while the digital camera 100 is in the image capturing mode shifts the digital camera 100 to the reproduction mode, and a latest image among images recorded on a recording medium 200 (to be described below) is displayed on the display unit 28. A MENU button 81 is a push button that is used in an instruction operation to display a menu screen. When the MENU button 81 is pressed, the menu screen on which various settings are set is displayed on the display unit 28. The user can intuitively perform various settings using the menu screen displayed on the display unit 28, the four directional key 74, and the SET button 75.

A touch bar 82 (multifunction bar: M-Fn bar) is a linear touch operation member (line touch sensor) for use in receiving a touch operation. The touch bar 82 is disposed at a position touch-operable (touchable) by a right thumb in a state in which a grip portion 90 is gripped by a right hand (gripped by a right little finger, a right ring finger, and a right middle finger) in a manner such that a right index finger can press the shutter button 61. In other words, the touch bar 82 is disposed at a position operable in a state in which the user is looking into a viewfinder with his/her eye being kept close to an eyepiece unit 16 and is holding the digital camera 100 in a manner ready to press the shutter button 61 (image capturing orientation). The touch bar 82 is a reception unit that receives, for example, a tap operation on the touch bar 82 (an operation of touching the touch bar 82 with a finger and detaching the finger within a predetermined time period without moving a touch position) and a left-right slide operation on the touch bar 82 (an operation of touching the touch bar 82 and then moving a touch position while touching the touch bar 82). The touch bar 82 is an operation member different from the touch panel 70a and does not include a display function.

A display switching button 83 is another example of an operation member and is a push button for use in switching information that is superimposed on a LV image in LV display in the image capturing mode. When a medical mode is ON, the display switching button 83 functions as a member for use in switching information to be displayed between medical information and imaging parameter information. When the medical mode is OFF, the display switching button 83 functions as a member for use in switching display between several patterns of imaging parameter information.

A multifunction controller 84 is an operation member in combination of an eight directional key operable in a plurality of directions, i.e., eight directions and a center push button. The multifunction controller 84 is for use in the autofocus setting to execute a function of adjusting a focus on a desired position (AF frame direct selection) in accordance with a user operation swiftly moving an autofocus frame (AF frame) indicating a position of a subject to be focused.

A smart controller 86 is an operation member in combination of an infrared detection member for detecting finger movements in eight directions and a center push button. The smart controller 86 is for use in the autofocus setting to execute a function of adjusting a focus on a desired position (AF frame direct selection) in accordance with a user operation swiftly moving an AF frame indicating a position of a subject to be focused. A photometry-in-progress AF frame selection function of selecting an AF frame only during photometry or during photometry timer measurement can also be allocated to the smart controller 86. Because the smart controller 86 detects a user operation by infrared rays, an erroneous operation occurs easily in particular. Thus, enabling a selection function of an AF frame during photometry (during photometry and during photometry timer measurement), which is a timing at which AF frame selection is executed, and invalidating an operation for the selection function at the other timings can further prevent an erroneous operation. "During photometry timer measurement" refers to a time period from when photometry processing included in an imaging preparation processing is performed in accordance with the first shutter switch signal SW1 until a predetermined period elapses.

A lock button 85 is a push button for use in collectively switching between lock and unlock of a plurality of operation members that can be easily erroneously operated. Operation members to be locked may include one or more of the main electronic dial 71, the sub electronic dial 73, the multifunction controller 84, the smart controller 86, the touch bar 82, and the touch panel 70a. In a locked state, even if a locked member is operated, the operation is disabled and a corresponding function is not executed.

A communication terminal 10 of the digital camera 100 is a communication terminal for use in communication with a lens unit 150 (detachable) to be described below. The eyepiece unit 16 is an eyepiece unit of an eyepiece viewfinder 17 (look-in viewfinder). The user can visually check a video displayed on an internal electric viewfinder (EVF)

29 via the eyepiece unit 16. An eye approximation detection unit 57 is an eye approximation detection sensor that detects whether an eye of a user (photographer) approaches the eyepiece unit 16. A lid 202 is a lid of a slot storing the recording medium 200 (to be described below). The grip portion 90 is a holding portion having a shape that can be easily grasped by a right hand when the user holds the digital camera 100. The shutter button 61 and the main electronic dial 71 are disposed at positions operable by the right index finger in a state in which the user holds the digital camera 100 by grasping the grip portion 90 with the right little finger, the right ring finger, and the right middle finger. In addition, the sub electronic dial 73 and the touch bar 82 are disposed at positions operable by the right thumb in the above-described holding state. A thumb rest portion 91 (thumb standby position) is a grip member disposed at a position on the rear side of the digital camera 100 where the user can naturally place his/her thumb of the right hand gripping the grip portion 90 in a state in which the user operates none of the operation members. The thumb rest portion 91 is formed of rubber member to enhance holding force (grip force).

<Configuration Block Diagram of Imaging Apparatus 100>

Figure 2:
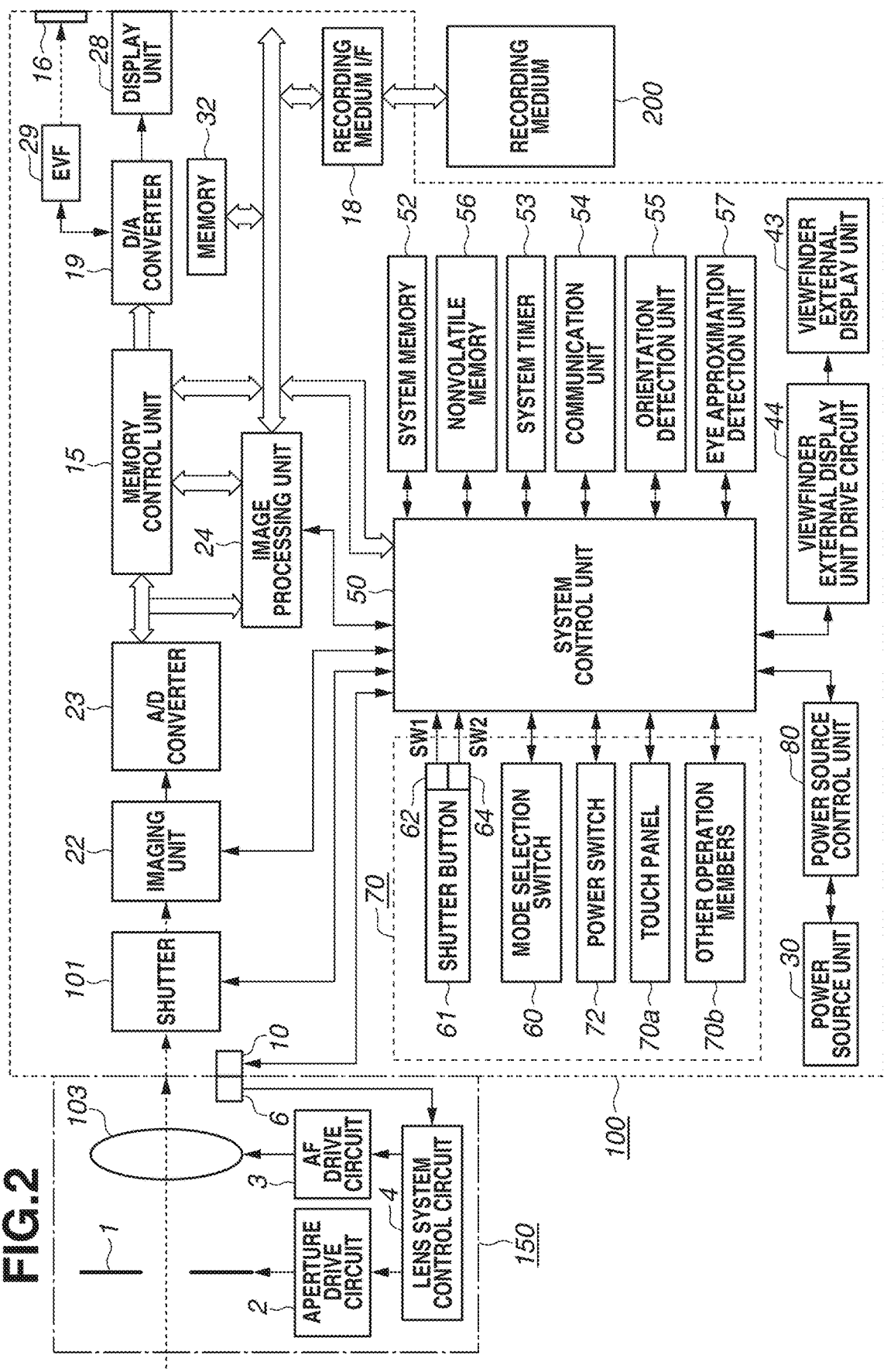
FIG. 2 is a block diagram of the imaging apparatus.

FIG. 2 is a block diagram illustrating a configuration example of the digital camera 100 (imaging apparatus). The lens unit 150 is a lens unit including an interchangeable imaging lens. While a lens 103 normally includes a plurality of lenses, the plurality of lenses is illustrated as one lens in FIG. 2 for the sake of simplification. A communication terminal 6 of the lens unit 150 is a communication terminal for use in communication with the digital camera 100. The communication terminal 10 of the digital camera 100 is the communication terminal for use in communication with the lens unit 150. The lens unit 150 communicates with a system control unit 50 via the communication terminals 6 and 10. Then, the lens unit 150 controls an aperture 1 via an aperture drive circuit 2 using a lens system control circuit 4 provided inside the lens unit 150. The lens unit 150 also executes focusing by displacing the position of the lens 103 via an autofocus (AF) drive circuit 3 using the lens system control circuit 4.

A shutter 101 is a focal plane shutter with which exposure time of an imaging unit 22 can be controlled under the control of the system control unit 50.

The imaging unit 22 is an image sensor including a charge-coupled device (CCD) sensor or a complementary metal-oxide semiconductor (CMOS) sensor that converts an optical image into an electrical signal. The imaging unit 22 can include an imaging plane phase difference sensor for outputting defocus amount information to the system control unit 50. An analog-to-digital (A/D) converter 23 converts an analog signal output from the imaging unit 22 into a digital signal.

An image processing unit 24 performs predetermined processing (pixel interpolation, resize processing, such as reduction, color conversion processing, etc.) on data from the A/D converter 23 or data from a memory control unit 15. The image processing unit 24 also performs predetermined calculation processing using data of a captured image. Based on the calculation result obtained by the image processing unit 24, the system control unit 50 performs exposure control and ranging control. Through-the-lens (TTL) system AF processing, AE processing, and electronic flash pre-emission (EF) processing are thus performed. The image processing unit 24 further performs predetermined calculation processing using data of a captured image, and also performs TTL system automatic white balance (AWB) processing, based on the obtained calculation result.

Data outputted from the A/D converter 23 is written into a memory 32 via the image processing unit 24 and the memory control unit 15. Alternatively, data outputted from the A/D converter 23 is written into the memory 32 via the memory control unit 15 not via the image processing unit 24. The memory 32 stores image data, obtained by the imaging unit 22 and converted by the A/D converter 23 into digital data, and image data to be displayed on the display unit 28 or the EVF 29. The memory 32 has a storage capacity sufficient for storing a predetermined number of still images and a moving image and voice having a predetermined time length.

The memory 32 also serves as a memory (video memory) for image display. A digital-to-analog (D/A) converter 19 converts display image data stored in the memory 32 into an analog signal and supplies the analog signal to the display unit 28 or the EVF 29. Display image data written into the memory 32 in this manner is displayed on the display unit 28 and the EVF 29 via the D/A converter 19. The display unit 28 and the EVF 29 are displays, such as a liquid crystal display (LCD) or an organic electroluminescence (EL) display, and perform display in accordance with an analog signal from the D/A converter 19. Digital signals A/D-converted by the A/D converter 23 and stored in the memory 32 are converted into analog signals by the D/A converter 19, and the analog signals are sequentially transferred to the display unit 28 and the EVF 29 and displayed on the display unit 28 and the EVF 29. Live view display (LV) can be thus performed. Hereinafter, an image displayed in live view display will be referred to as a live view image (LV image).

The system control unit 50 is a control unit including at least one processor and/or at least one circuit and controls the entire operation of the digital camera 100. The system control unit 50 is a processor, and is a circuit. By executing a program recorded on a nonvolatile memory 56, the system control unit 50 implements each piece of processing in the present example embodiment, which will be described below. The system control unit 50 also performs display control by controlling the memory 32, the D/A converter 19, the display unit 28, and the EVF 29.

For example, a random access memory (RAM) serves as a system memory 52. The system control unit 50 loads constants for operating the system control unit 50, variables, and programs read out from the nonvolatile memory 56, into the system memory 52.

The nonvolatile memory 56 is an electrically-erasable/recordable memory, and is an electrically erasable programmable read-only memory (EEPROM), for example. Constants for operating the system control unit 50 and programs are recorded on the nonvolatile memory 56. The programs refer to programs for various processes of flowcharts to be described below in the present example embodiment.

A system timer 53 is a time measuring unit for measuring a time to be used for various types of control and a time of a built-in clock.

Figure 18:
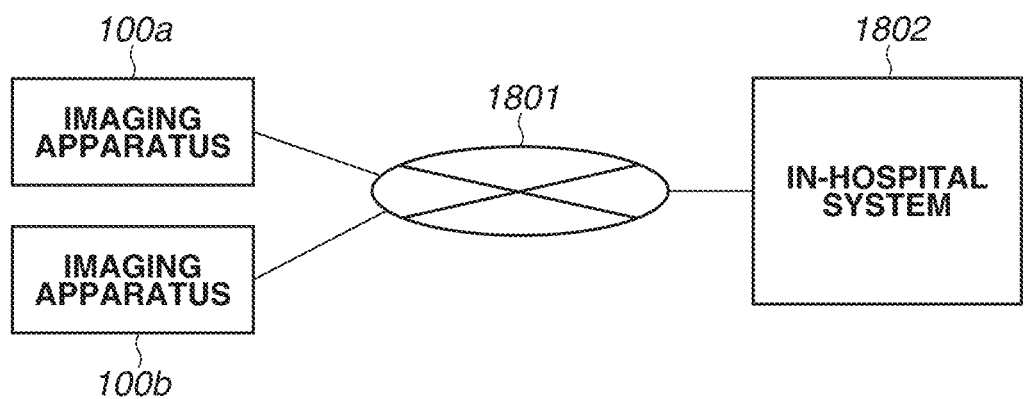
FIG. 18 is a diagram illustrating a network system of an in-hospital system and an imaging apparatus.

A communication unit 54 transmits and receives video signals and audio signals to and from an external device connected wirelessly or via a cable. The communication unit 54 can also be connected with a wireless local area network (LAN) and the Internet. The communication unit 54 can also communicate with an external device via Bluetooth® or Bluetooth® Low Energy. The communication unit 54 can transmit an image (including a LV image) captured by the imaging unit 22 and an image recorded on the recording medium 200. In the present example embodiment, the digital camera 100 can communicate with an in-hospital system (medical system of, for example, electronic medical charts and a medical accounting system) serving as an external device, via a server. Then, the digital camera 100 can receive, from the in-hospital system, medical information (including patient information, user information, affected area information), image data, and other various types of information. As illustrated in FIG. 18, an in-hospital network system within a hospital includes a server 1801 and an in-hospital system 1802. A plurality of digital cameras (imaging apparatuses) 100a and 100b can connect to the server 1801 via each of the communication unit 54 of the digital cameras, and acquire various types of information from the in-hospital system 1802. In the present example embodiment, the server 1801 different from the in-hospital system 1802 is used. Because the communication is executed via the server 1801, information transmission and reception between the imaging apparatuses 100 and the in-hospital system 1802 can be implemented without extensive changes in the in-hospital system 1802. In addition, the imaging apparatuses 100 can directly connect to the in-hospital system 1802 not via the server 1801. Alternatively, the function of the server 1801 can be provided in the in-hospital system 1802. In the above-described manner, an imaging apparatus 100 according to an example embodiment of the present invention can connect with a predetermined specific system (server 1801 or in-hospital system 1802) and acquire patient information and information regarding a doctor and/or nurse from electronic medical charts or a medical accounting system of the in-hospital system 1802. While, in the present example embodiment, an in-hospital system 1802 will be described as a medical system, the medical system needs not be installed inside a hospital. The medical system can be a system in which the imaging apparatuses 100 communicate with a server or a medical system that is provided on the outside of a hospital, via the internet.

An orientation detection unit 55 detects the orientation of the digital camera 100 with respect to a direction of gravitational force. Based on the orientation detected by the orientation detection unit 55, determination of whether an image captured by the imaging unit 22 is an image captured with the digital camera 100 being held in a landscape direction or an image captured with the digital camera 100 being held in a portrait direction can be performed. The system control unit 50 can add orientation information corresponding to the orientation detected by the orientation detection unit 55, to an image file of an image captured by the imaging unit 22, or rotate an image and store the rotated image. As the orientation detection unit 55, an acceleration sensor or a gyro sensor can be used. The acceleration sensor or the gyro sensor serving as the orientation detection unit 55 can also be used to detect the movement (pan, tilt, lifting, whether stationary, etc.) of the digital camera 100.

The eye approximation detection unit 57 is an eye approximation detection sensor that detects an approximation and a separation of an eye (object) with respect to the eyepiece unit 16 of an eyepiece viewfinder 17 (hereinafter, simply described as "viewfinder") (approximation detection). In accordance with the state detected by the eye approximation detection unit 57, the system control unit 50 switches the display (displayed state)/nondisplay (non-displayed state) of the display unit 28 and the EVF 29. More specifically, in a case where the digital camera 100 is at least in an imaging standby state and a switching setting of a display destination is set to an automatic switching setting, the display destination is set to the display unit 28 and the display is set to ON, and the EVF 29 is set to the non-displayed state, during the separation of an eye from the eyepiece unit 16. Alternatively, in a case where an eye approaches the eyepiece unit 16, the display destination is set to the EVF 29 and the display is set to ON, and the display unit 28 is set to the non-displayed state. For example, an infrared light proximity sensor can be used as the eye approximation detection unit 57. The eye approximation detection unit 57 can detect an approximation of any object to the eyepiece unit 16 of the viewfinder 17 incorporating the EVF 29. In a case where an object approaches, infrared light projected from a light projection unit (not illustrated) of the eye approximation detection unit 57 is reflected on the object and received by a light receiving unit (not illustrated) of the infrared light proximity sensor. Based on an amount of the received infrared light, a distance between the object and the eyepiece unit 16 (eye approximation distance) can also be determined. In the above-described manner, the eye approximation detection unit 57 performs eye approximation detection of detecting an approximation distance of an object to the eyepiece unit 16. In a case where an object that approaches the eyepiece unit 16 at less than or equal to a predetermined distance away from the eyepiece unit 16 in a non-contact state (separated state) is detected, an approximation of the eye is detected. In a case where an object of which approximation to the eyepiece unit 16 had been detected is separated from the eyepiece unit 16 by a predetermined distance or more in a contact state (approximated state), the separation of the eye is detected. A threshold for detecting the approximation of the eye and a threshold for detecting the separation of the eye may be different from each other by providing a hysteresis, for example. In addition, after the approximation of the eye is detected, the contact state is maintained until a separation of the eye is detected. After the separation of the eye is detected, the non-contact state is kept until an approximation of the eye is detected. The infrared light proximity sensor is an example, and a different sensor can be employed as the eye approximation detection unit 57 as long as the sensor can detect the proximity of an eye or an object that can be considered as an eye in the detection of the proximity.

Various camera setting values including a shutter speed and an aperture value are displayed on the viewfinder external display unit 43 via a viewfinder external display unit drive circuit 44.

A power source control unit 80 includes a battery detection circuit, a direct current (DC)-DC converter, and a switch circuit for switching a block to be supplied with power. The power source control unit 80 detects whether or not a battery is attached, the type of the battery, and remaining battery capacity. In addition, the power source control unit 80 controls the DC-DC converter, based on the detection result and an instruction from the system control unit 50, and supplies necessary voltage to components including the recording medium 200 for a necessary time period. A power source unit 30 includes a primary battery, such as an alkaline battery and a lithium battery, a secondary battery, such as a nickel-cadmium (NiCd) battery, a nickel-metal hydride (NiMH) battery, and a lithium (Li) battery, and an alternating current (AC) adapter.

A recording medium interface (I/F) 18 is an interface to the recording medium 200, such as a memory card and a hard disc. The recording medium 200 is a recording medium, such as a memory card, for recording a captured image and includes a semiconductor memory or a magnetic disc.

An operation unit 70 is an input unit for receiving operations (user operations) from the user and is for use in inputting various operation instructions to the system control unit 50. As illustrated in FIG. 2, the operation unit 70 includes the shutter button 61, the mode selection switch 60, the power switch 72, the touch panel 70a, and other operation members 70b. The other operation members 70b include the main electronic dial 71, the sub electronic dial 73, the four directional key 74, the SET button 75, the movie button 76, the AE lock button 77, the enlargement button 78, the reproduction button 79, the MENU button 81, the touch bar 82, the display switching button 83, the multifunction controller 84, the smart controller 86, and the lock button 85.

The shutter button 61 includes a first shutter switch 62 and a second shutter switch 64. The first shutter switch 62 is turned ON in the middle of an operation on the shutter button 61. The first shutter switch 62 is turned ON by a half pressing operation (i.e. an imaging preparation instruction) and outputs a first shutter switch signal SW1. In accordance with the first shutter switch signal SW1, the system control unit 50 starts imaging preparation processing, such as AF processing, AE processing, AWB processing, or EF processing.

The second shutter switch 64 is turned ON upon completion of an operation on the shutter button 61. The second shutter switch 64 is turned ON by a full pressing operation (i.e. imaging instruction) and outputs a second shutter switch signal SW2. In accordance with the second shutter switch signal SW2, the system control unit 50 starts a series of imaging processes starting from signal readout from the imaging unit 22 up to writing of a generated image file including a captured image into the recording medium 200.

The mode selection switch 60 switches an operation mode of the system control unit 50 to either mode of a still image capturing mode, a moving image capturing mode, and a reproduction mode. The still image capturing mode includes modes, such as an automatic image capturing mode, an automatic scene determination mode, a manual mode, an aperture priority mode (Av mode), a shutter speed priority mode (Tv mode), and a program AE mode (P mode). The still image capturing mode further includes modes, such as various scene modes each having a different image capturing setting for a corresponding image capturing scene and a custom mode. The user uses the mode selection switch 60 to directly switch an operation mode to any one of the modes. Alternatively, an operation mode can be switched in the following manner. The mode selection switch 60 switches a screen to a list screen of image capturing modes, and then any one of a plurality of displayed modes is selected using another operation member so that an operation mode is switched to the selected mode. Similar to the still image capturing mode, the moving image capturing mode can include a plurality of modes.

The touch panel 70a is a touch sensor that detects various touch operations on the display surface of the display unit 28 (operation surface of the touch panel 70a). The touch panel 70a and the display unit 28 can be integrally formed. For example, the touch panel 70a is attached to a top layer of the display surface of the display unit 28 in a manner such that light transmittance does not disturb display on the display unit 28. Then, an input coordinate on the touch panel 70a and a display coordinate on the display surface of the display unit 28 are associated with each other. This structure can provide a graphical user interface (GUI) that performs display as if the user could directly operate a screen displayed on the display unit 28.

The system control unit 50 can detect the following operations performed on the touch panel 70a or the following state of the touch panel 70a.

An operation of a finger or a stylus that has not been in touch with the touch panel 70a newly touching the touch panel 70a, i.e., the start of a touch on the touch panel 70a (hereinafter, referred to as "Touch-Down").

A state in which a finger or a stylus is in touch with the touch panel 70a (hereinafter, referred to as "Touch-On").

An operation of a finger or a stylus moving over the touch panel 70a while being in touch with the touch panel 70a (hereinafter, referred to as "Touch-Move").

The detachment (release) of a finger or a stylus that has been in touch with the touch panel 70a, i.e., the end of a touch on the touch panel 70a (hereinafter, referred to as "Touch-Up").

A state in which nothing touches the touch panel 70a (hereinafter, referred to as "Touch-Off").

When the Touch-Down is detected, the Touch-On is simultaneously detected. After the Touch-Down, normally, the Touch-On continues to be detected until the Touch-Up is detected. The Touch-On is simultaneously detected also in a case where the Touch-Move is detected. Even when the Touch-On is detected, the Touch-Move is not detected unless a touch position moves. After the Touch-Up of all the fingers or styluses that have been in touch is detected, the Touch-Off is detected.

These operations and states and a position coordinate on the touch panel 70a at which a finger or a stylus is in touch are notified to the system control unit 50 via an internal bus. Based on the notified information, the system control unit 50 then determines the type of an operation (touch operation) performed on the touch panel 70a. In the Touch-Move, a moving direction of a finger or a stylus moving on the touch panel 70a can also be determined for each perpendicular component/horizontal component on the touch panel 70a, based on a change in position coordinate. In a case where it is detected that the Touch-Move is performed for a predetermined distance or more, the system control unit 50 determines that a slide operation has been performed. An operation of swiftly moving a finger by a certain amount of distance with the finger being in touch with the touch panel 70a and then detaching the finger will be referred to as a flick. In other words, the flick is an operation of swiftly moving the finger over the touch panel 70a like a flip. In a case where it is detected that the Touch-Move has been performed at a predetermined speed or more for a predetermined distance or more, and the Touch-Up is detected in this state, the system control unit 50 determines that a flick has been performed (it can be determined that a flick has been performed subsequent to the slide operation). Furthermore, a touch operation of touching a plurality of locations (e.g. two points) together (multi-touch), and bringing the touch positions closer to each other will be referred to as "pinch-in", and a touch operation of bringing the touch positions away from each other will be referred to as "pinch-out". The pinch-out and the pinch-in will be collectively referred to as a pinch operation (or simply "pinch"). As the touch panel 70a, a touch panel of any of the following various types can be used: a resistive touch panel, a capacitive touch panel, a surface acoustic wave touch panel, an infrared touch panel, an electromagnetic induction type touch panel, an image recognition type touch panel, and an optical sensor type touch panel. Some touch panels detect a touch upon detecting contact with the touch panel 70a while the other touch panels detect a touch upon detecting the proximity of a finger or a stylus to the touch panel 70a. A touch panel of any types can be used.

Next, a basic operation of an imaging apparatus (the digital camera) 100 according to the present example embodiment will be described.

As described below, the imaging apparatus 100 (the system control unit 50) switches an image capturing mode of the imaging apparatus between a medical mode (e.g. medical mode is set to ON) and a normal image capturing mode (e.g. medical mode is set to OFF). For example, the imaging apparatus 100 can switch between ON and OFF of a medical mode by a setting on a menu screen. In a case where ON/OFF of the medical mode is switched, an operation to be described below becomes effective in a case where the medical mode is set to ON. In a case where the medical mode is set to OFF, a mode becomes a normal image capturing mode. While, in the present example embodiment, a mode is switched between the medical mode and the normal image capturing mode by an operation on the menu screen, switching between the medical mode and the normal image capturing mode can be performed in accordance with an operation on a specific operation member. More details of switching to a medical mode are given below with reference to FIGS. 14A and 14B. A medical mode may be a mode of the imaging apparatus for use in a medical workplace or medical environment, in which the imaging apparatus may perform various operations for use in carrying out a medical process.

Operations in the medical mode can include one or more of patient information acquisition processing, user information acquisition processing, region information acquisition processing, affected area image capturing processing, affected area image confirmation processing, and affected area image retransmission processing.

In the patient information acquisition processing, the imaging apparatus 100 transmits image data, such as a barcode or a two-dimensional code, of a patient ID that has been read or acquired as a LV image, to the in-hospital system 1802 via the communication unit 54. Then, the imaging apparatus 100 receives and acquires patient information, such as a name, gender, and age, that is based on the code included in the image data, from the in-hospital system 1802 via the communication unit 54. Data to be transmitted to the in-hospital system 1802 can be acquired in the following manner. More specifically, a code is acquired from image data in the imaging apparatus 100, code information is transmitted to the in-hospital system 1802, and patient information is acquired from the in-hospital system 1802 based on the code. Alternatively, the imaging apparatus 100 can acquire an ID code from an integrated circuit (IC) chip embedded in a patient's registration card, and acquire patient information corresponding to the ID code, from the in-hospital system 1802.

In the user information acquisition processing, the imaging apparatus 100 transmits, to the in-hospital system 1802 via the communication unit 54, image data obtained by reading an ID code (barcode, two-dimensional code, etc.) of a user (doctor, nurse) of a medical image or image data obtained as a captured LV image of the ID code. Then, the imaging apparatus 100 receives and acquires user information, such as a name and a medical diagnosis and a treatment department of a user (doctor/nurse, etc.), obtained based on the code included in the image data from the in-hospital system 1802 via the communication unit 54. Data to be transmitted to the in-hospital system 1802 can be acquired in the following manner. More specifically, a code is acquired from image data in the imaging apparatus 100, code information is transmitted to the in-hospital system 1802, and user information is acquired from the in-hospital system 1802 based on the code.

In the region information acquisition processing, the imaging apparatus 100 acquires list information of regions from the in-hospital system 1802 via the communication unit 54, and the user selects a region corresponding to an affected area from the region list and determines the region.

In the affected area image capturing processing, the imaging apparatus 100 captures an image of a subject (affected area of patient) by an image capturing operation of the user, records obtained image data into the recording medium 200 in association with medical information including, patient information, user information, and region information, and transmits the image data to the in-hospital system 1802 via the communication unit 54. As a method of associating image data and medical information, medical information can be embedded into a part of image data. Alternatively, image data and medical information can be stored as separated files while the files are associated with each other using file names.

In the affected area image confirmation processing, a thumbnail image captured in the affected area image capturing processing and medical information associated with image data are displayed, and the user executes processing of confirming the thumbnail image and the medical information. A result of the confirmation, including OK or not OK, is transmitted to the in-hospital system 1802.

In the affected area image retransmission processing, processing of retransmitting image data that has been generated in the affected area image capturing processing but failed to be properly transmitted to the in-hospital system is executed. The causes of the transmission failure include an error in communication between the imaging apparatus 100 and the in-hospital system 1802 and an error in communication between the in-hospital system 1802 and a database.

<Customization Setting>

The imaging apparatus 100 according to the present example embodiment can set a customization setting to allocate a function to be executed to a plurality of the operation members. FIGS. 15A to 15E are diagrams each illustrating an example of a customization function setting screen.

Figure 15A:
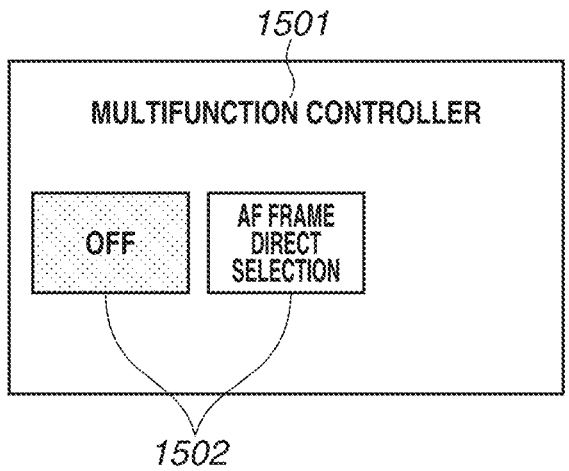
FIGS. 15A to 15E are diagrams each illustrating an example of a customization function setting screen.

FIG. 15A illustrates an example of a customization function setting screen which is for the multifunction controller 84 and is displayed when the medical mode is OFF. On the screen, an item 1501 indicating an operation member name of a setting target is displayed. Because the imaging apparatus 100 according to the present example embodiment can allocate a function to be executed to a plurality of the operation members, the item 1501 is displayed so that the user can identify a setting target operation member name. In FIG. 15A, MULTIFUNCTION CONTROLLER is displayed in the item 1501 as a setting target operation member name. A function item(s) 1502 is also displayed to indicate settable customization function(s) (function(s) to be allocated to an operation member). As for the multifunction controller 84, "OFF" and "AF frame direct selection" are displayed as the function items 1502 of customization functions. The OFF setting is a setting to not allocate a function to the operation member, and consequently, an operation on the operation member becomes invalid. In a case where a function item other than the OFF setting is selected, a corresponding function is allocated to an operation member, and consequently, an operation on the operation member becomes valid. To prevent an erroneous operation of the multifunction controller 84, a default setting value is set to the OFF setting and an OFF item is displayed at the leftmost position among items.

Figure 15D:
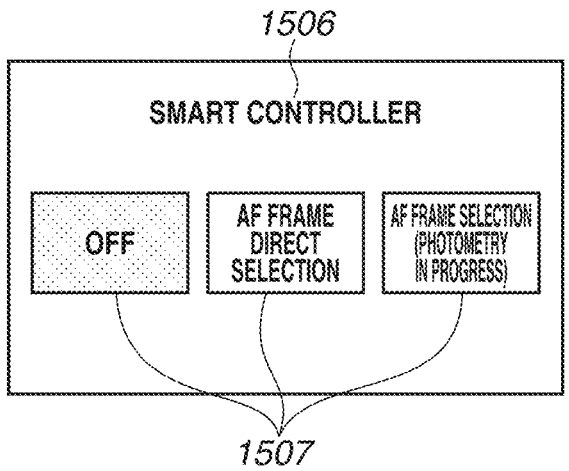
Figure 15B:
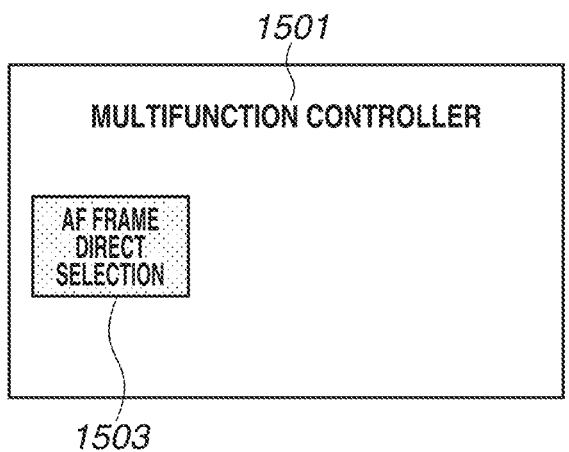

FIG. 15B illustrates an example of a customization function setting screen which is for the multifunction controller 84 and is displayed when the medical mode is ON. On the screen, the item 1501 for a setting target operation member name and a function item 1503 for a customization function settable when the medical mode is ON are displayed. Because there is little concern about an erroneous operation in the medical mode, an OFF setting is hidden from the screen so that the OFF setting is unselectable, and only "af frame direct selection" is displayed in a selected state as a default value. Because a possibility of an erroneous operation is little in the medical mode and capturing a clear affected area image is demanded in a medical workplace, selection of an AF position becomes important. For this reason, in the medical mode, the OFF setting (disabling of an operation member) is unselectable (e.g. the operation member is set to an enabled state) and a function related to AF is allocated to the multifunction controller 84.

Figure 15E:
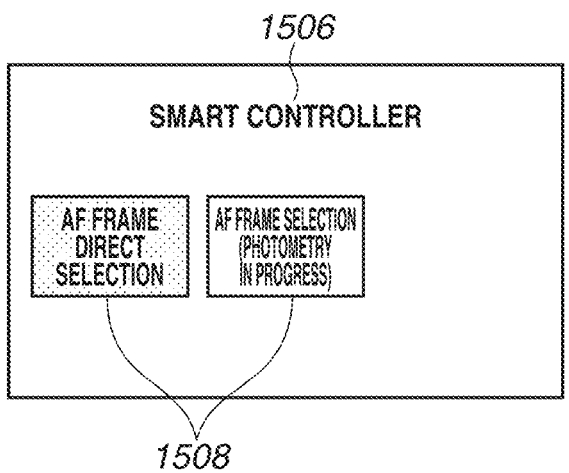
Figure 15C:
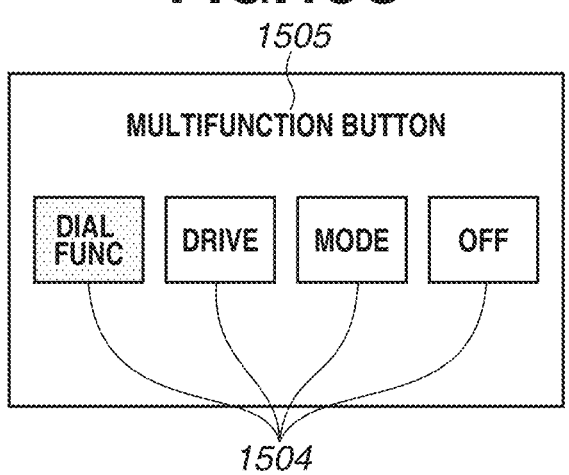

FIG. 15C illustrates an example of a customization function setting screen which is for another operation member other than the multifunction controller 84 and the smart controller 86. FIG. 15C illustrates a customization function setting screen for a multifunctional button. On the screen, an item 1505 indicating a setting target operation member name and function items 1504 of settable customization functions are displayed. Because there is little concern about an erroneous operation of an operation member other than the multifunction controller 84 and the smart controller 86, a function is allocated as a default value instead of an OFF setting, and a default setting function is displayed at the leftmost position. The OFF setting is used for a setting target operation member by the user with intention of not using the operation member. As for an operation member other than the multifunction controller 84 and the smart controller 86, the OFF setting is displayed irrespective of whether the medical mode is ON or OFF, and the user can select an enabled state (e.g. a state in which the operation member can be operated) and a disabled state (e.g. a state in which the operation member cannot be operated) of the operation member.

FIG. 15D illustrates an example of a customization function setting screen which is for the smart controller 86 and is displayed when the medical mode is OFF. On the screen, an item 1506 for a setting target operation member name and function items 1507 of settable customization functions are displayed. Similarly to the multifunction controller 84, an OFF setting is a default setting for the smart controller 86. With respect to the smart controller 86, not only "OFF setting" and "AF frame direct selection" but also "AF frame selection (photometry in progress)" is displayed and the displayed functions are selectable. As described above, the "AF frame selection (photometry in progress)" is a function of moving an AF frame during photometry or during photometry timer measurement (during a predetermined period from when photometry processing is performed in response to a pressing operation on the first shutter switch 62).

FIG. 15E illustrates an example of a customization function setting screen which is for the smart controller 86 and is displayed when the medical mode is ON. On the screen, an item 1506 for a setting target operation member name and function items 1508 of customization functions settable when the medical mode is ON are displayed. Because the medical mode is ON, similarly to the customization function setting screen for the multifunction controller 84 that is illustrated in FIG. 15B, an OFF setting is hidden from the screen and is unselectable, and "AF frame direct selection" is displayed in a selected state as a default value.

Figure 16:
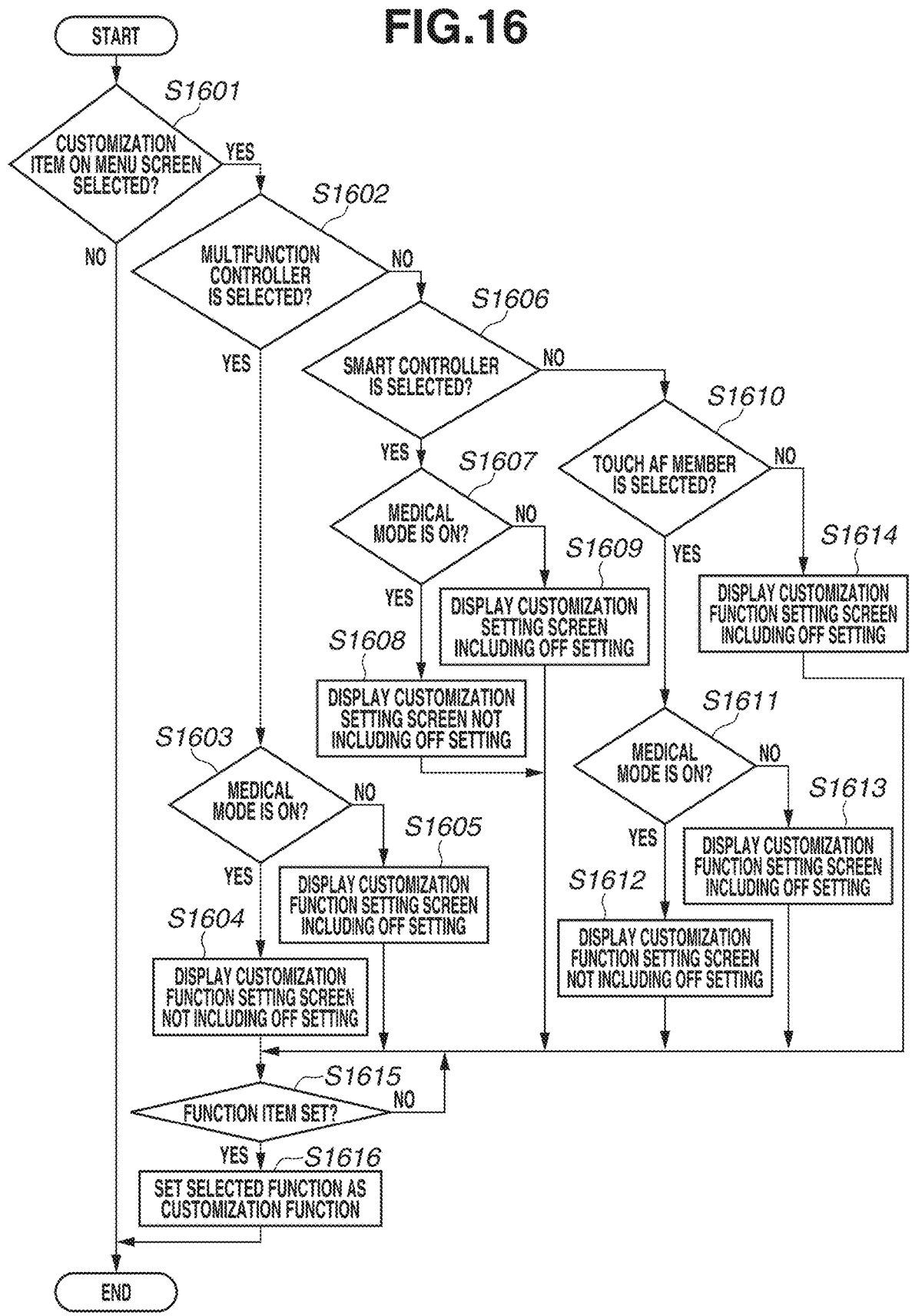
FIG. 16 is a flowchart illustrating processing of a customization setting.

Hereinafter, customization setting processing will be described with reference to FIG. 16. FIG. 16 is a flowchart illustrating the customization setting processing. Each piece of processing of the flowchart is implemented by the system control unit 50 loading a program stored in the nonvolatile memory 56 into the system memory 52 and executing the program. The system control unit 50 is arranged to set an operation member to an enabled state (e.g. an OFF setting is unselectable so that the operation member is in a state when it can be operated) or a disabled state (e.g. an OFF setting is selectable and has been selected so that the operation member is in a state when it cannot be operated).

In step S1601, the system control unit 50 determines whether the user has selected an item of operation member customization on a MENU screen. The selection is performed by a touching operation on an operation member customization item or a pressing operation on the SET button 75 in a state in which a selection frame is set on an operation member customization item by a dial operation or a cross key operation. In a case where an operation member customization item has been selected (YES in step S1601), the processing proceeds to step S1602. In a case where an operation member customization item has not been selected (NO in step S1601), the processing ends.

In step S1602, the system control unit 50 determines whether the user has selected the multifunction controller 84 as an operation member to be customized. In a case where the multifunction controller 84 has been selected (YES in step S1602), the processing proceeds to step S1603. In a case where the multifunction controller 84 has not been selected (NO in step S1602), the processing proceeds to step S1606.

In step S1603, the system control unit 50 determines whether the medical mode is ON. In a case where the medical mode is ON (YES in step S1603), the processing proceeds to step S1604. In a case where the medical mode is OFF (NO in step S1603), the processing proceeds to step S1605.

In step S1604, the system control unit 50 displays a customization function setting screen for the multifunction controller 84 on which the OFF setting is unselectable as illustrated in FIG. 15B. For example, when the image capturing mode is the medical mode (medical mode is ON), the system control unit 50 performs control to allow to set the operation member (in this case the multifunction controller 84) to the enabled state by ensuring the OFF setting is unselectable.

In step S1605, the system control unit 50 displays a customization function setting screen for the multifunction controller 84 on which the OFF setting is selectable as illustrated in FIG. 15A.

In step S1606, the system control unit 50 determines whether the user has selected the smart controller 86 as an operation member to be customized. In a case where the smart controller 86 has been selected (YES in step S1606), the processing proceeds to step S1607. In a case where the smart controller 86 has not been selected (NO in step S1606), the processing proceeds to step S1610.

In step S1607, the system control unit 50 determines whether the medical mode is ON. In a case where the medical mode is ON (YES in step S1607), the processing proceeds to step S1608. In a case where the medical mode is OFF (NO in step S1607), the processing proceeds to step S1609.

In step S1608, the system control unit 50 displays the customization function setting screen for the smart controller 86 on which the OFF setting is unselectable as illustrated in FIG. 15E.

In step S1609, the system control unit 50 displays the customization function setting screen for the smart controller 86 on which the OFF setting is selectable as illustrated in FIG. 15D.

In step S1610, the system control unit 50 determines whether the user has selected the touch AF as an operation to be customized. In a case where the touch AF member has been selected (YES in step S1610), the processing proceeds to step S1611. In a case where the touch AF member has not been selected (NO in step S1610), the processing proceeds to step S1614.

In step S1611, the system control unit 50 determines whether the medical mode is ON. In a case where the medical mode is ON (YES in step S1611), the processing proceeds to step S1612. In a case where the medical mode is OFF (NO in step S1607), the processing proceeds to step S1613.

In step S1612, the system control unit 50 displays a customization function setting screen (not illustrated) for the touch AF on which the OFF setting is unselectable.

In step S1613, the system control unit 50 displays a customization function setting screen (not illustrated) for the touch AF on which the OFF setting is selectable.

In step S1614, the system control unit 50 displays a customization function setting screen for a selected operation member as illustrated in FIG. 15C, for example. As for an operation member other than the multifunction controller 84, the smart controller 86, and the touch AF member, a customization function setting screen on which the OFF setting is selectable is displayed irrespective of whether the medical mode is ON or OFF.

In step S1615, the system control unit 50 determines whether the user has set a function item to allocate the function item to the operation member. The setting is performed by a touching operation on a function item or a pressing operation on the SET button 75. In a case where a function item has been set (YES in step S1615), the processing proceeds to step S1616. In a case where a function item has not been set (NO in step S1615), the processing returns to step S1615.

In step S1616, the system control unit 50 sets a function corresponding to the function item selected by the user as a customization function of a setting target operation member.

In the above-described manner, the imaging apparatus 100 according to the present example embodiment can perform the customization setting to set a function to be allocated to each operation member. In a case where an imaging apparatus 100 is used in a medical workplace, a camera needs not be put around the user's shoulder and there is no need to worry about an erroneous operation. Thus, a lock function and an OFF setting of customization to prevent an erroneous operation are unnecessary settings, which may disturb a smooth image capturing operation of the user instead. In view of the foregoing, in the imaging apparatus 100 according to the present example embodiment, in a case where the medical mode is ON, the OFF setting for invalidating an operation on an operation member is not displayed on the customization function setting screen for the multifunction controller 84, the smart controller 86, or the touch AF, so that a function related to AF is set. In the present example embodiment, the OFF setting is hidden. Alternatively, the OFF setting can be grayed out to notify the user that the OFF setting is in an unselectable state. On the other hand, as for an operation member other than the multifunction controller 84, the smart controller 86, and the touch AF member, the OFF setting is displayed in a settable manner irrespective of whether the medical mode is ON or OFF.

<Lock Function>

Aside from the customization setting of an operation member, the imaging apparatus 100 according to the present example embodiment includes a lock function with which a function is not executed even if an operation member is operated.

Figure 17:
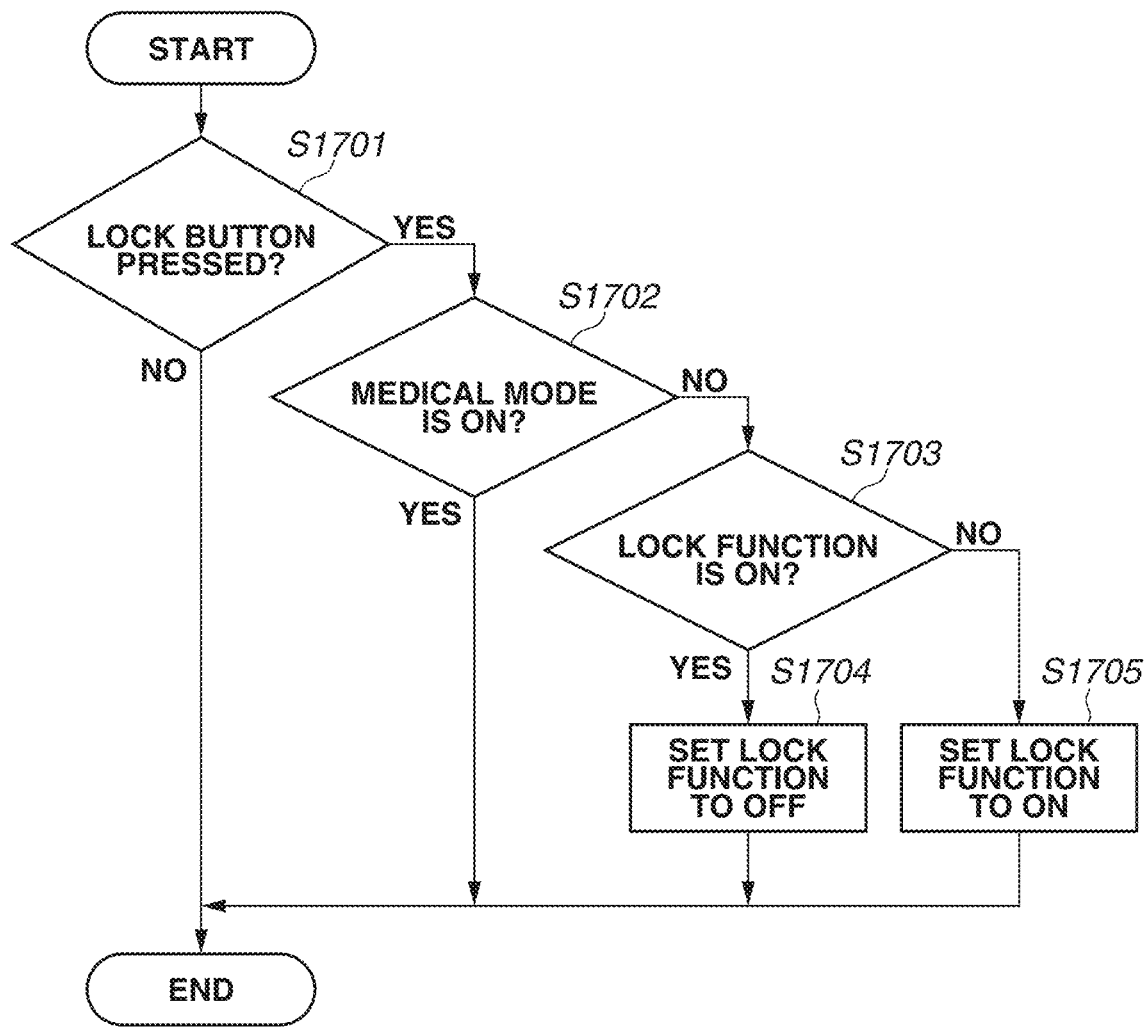
FIG. 17 is a flowchart of lock function switching processing of an operation member.

Hereinafter, switching processing of the lock function will be described with reference to FIG. 17. FIG. 17 is a flowchart illustrating processing of the lock function. Each piece of processing of the flowchart is implemented by the system control unit 50 loading a program stored in the nonvolatile memory 56 into the system memory 52 and executing the program.

In step S1701, the system control unit 50 determines whether the user has pressed the lock button 85. In a case where the lock button 85 has been pressed (YES in step S1701), the processing proceeds to step S1702. In a case where the lock button 85 has not been pressed (NO in step S1701), the processing ends.

In step S1702, the system control unit 50 determines whether the medical mode is ON. In a case where the medical mode is ON (YES in step S1702), the processing ends. In other words, in a case where the medical mode is ON, even when the lock button 85 is pressed, the lock function is not executed. In a case where the medical mode is ON, the lock function is switched to OFF when a transition to the medical mode is performed, and consequently, even when the lock button 85 is operated, no function is executed. In other words, in a case where the medical mode is ON, the system control unit 50 invalidates an operation on the lock button. The lock button 85 is an example of a specific operation member the operation of which, in the case where the image capturing mode is the medical mode (e.g. the medical mode is ON), can be invalidated by the system control unit 50.

In a case where the medical mode is OFF (NO in step S1702), the processing proceeds to step S1703.

In step S1703, the system control unit 50 determines whether the lock function is ON. In a case where the lock function is ON (YES in step S1703), the processing proceeds to step S1704. In a case where the lock function is OFF (NO in step S1703), the processing proceeds to step S1705. In step S1704, the system control unit 50 sets the lock function to OFF to unlock the operation members. In step S1705, the system control unit 50 sets the lock function to ON and executes the lock function to invalidate an operation on the operation members. In the above-described manner, in a case where the medical mode is OFF, ON and OFF of the lock function is switched in accordance with a pressing operation on the lock button 85. Some operation members (e.g., shutter button, etc.) are excluded from the target of the lock function. Thus, even in a case where the lock function is ON, an operation on the shutter button is not invalidated, and thus it is possible to avoid missing a photo opportunity. In the present example embodiment, operation members targeted by the lock function include the main electronic dial 71, the sub electronic dial 73, the multifunction controller 84, the smart controller 86, the touch bar 82, and the touch panel 70a. Alternatively, the operation members targeted by the lock function can be pre-settable by the user without being fixed.

In the above-described manner, by setting a function corresponding to an operation member to OFF using a customization setting of the operation member or by setting the lock function, the imaging apparatus 100 according to the present example embodiment can prevent a function from being executed even in a case where an operation member is operated. When the imaging apparatus 100 is normally used, in some cases, a strap is attached to the imaging apparatus 100, and the imaging apparatus 100 is used with the strap put around the user's neck or shoulder. In such a case, an operation member may be unintentionally operated and a setting may be changed while the imaging apparatus 100 is put around the user's neck in an unused state. Thus, by using the OFF setting of the customization setting or the lock function, it is possible to prevent a function from being unintentionally executed. However, in a case where the medical mode is ON, the imaging apparatus 100 is generally used without a strap wearable on the user's neck or shoulder. The lock function is thus set to be disabled even when the lock button 85 is operated. In a case where the medical mode is ON, because it is necessary to capture an image clearly showing an affected area, the setting of AF becomes important. Thus, in the medical mode, the imaging apparatus 100 according to the present example embodiment allocates a function of an AF to the multifunction controller 84, the smart controller 86, and the touch AF member, to prevent operations on these operation members from being invalidated.

Figure 14A:
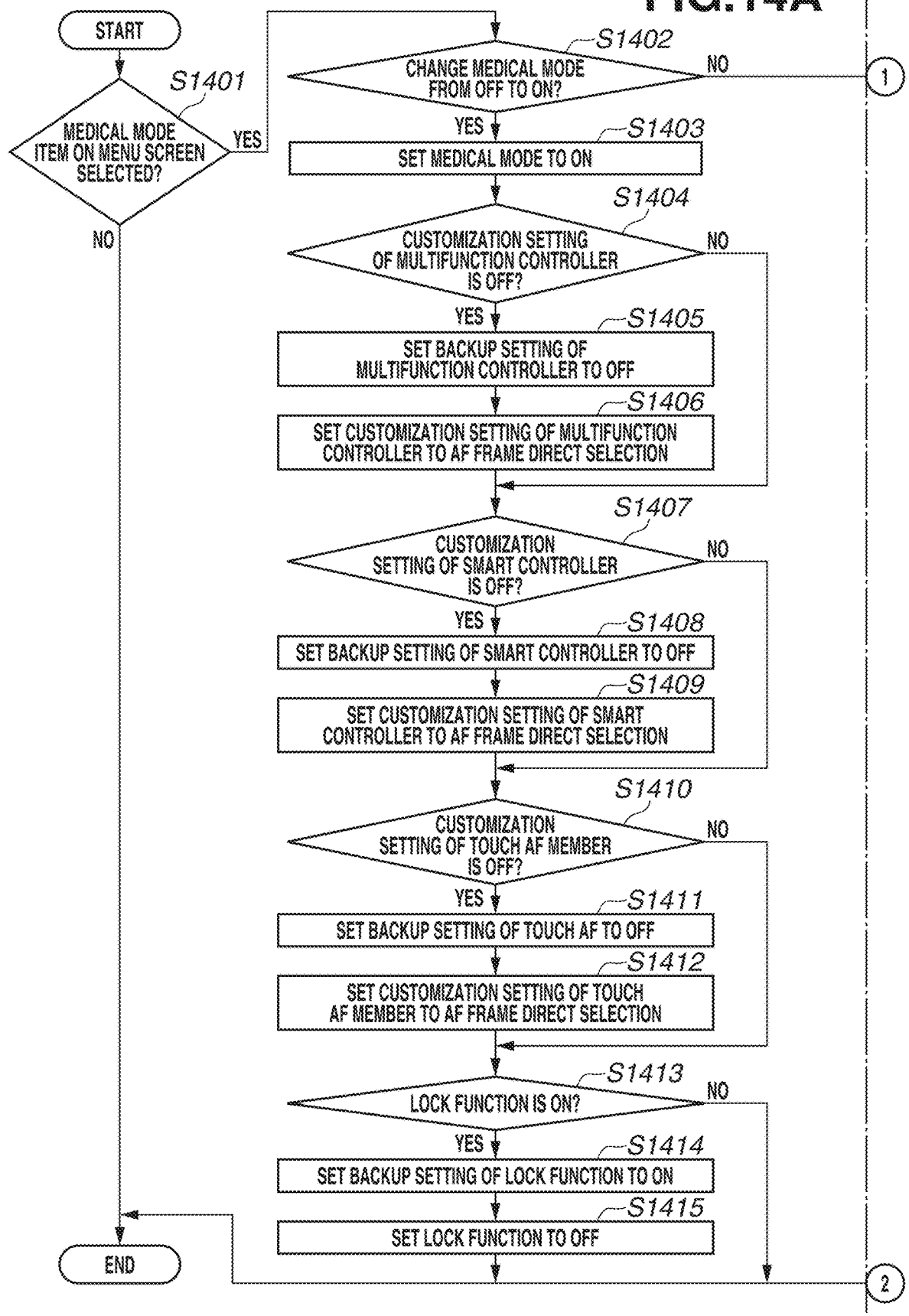
FIGS. 14A and 14B are flowcharts illustrating medical mode switching processing.
Figure 14B:
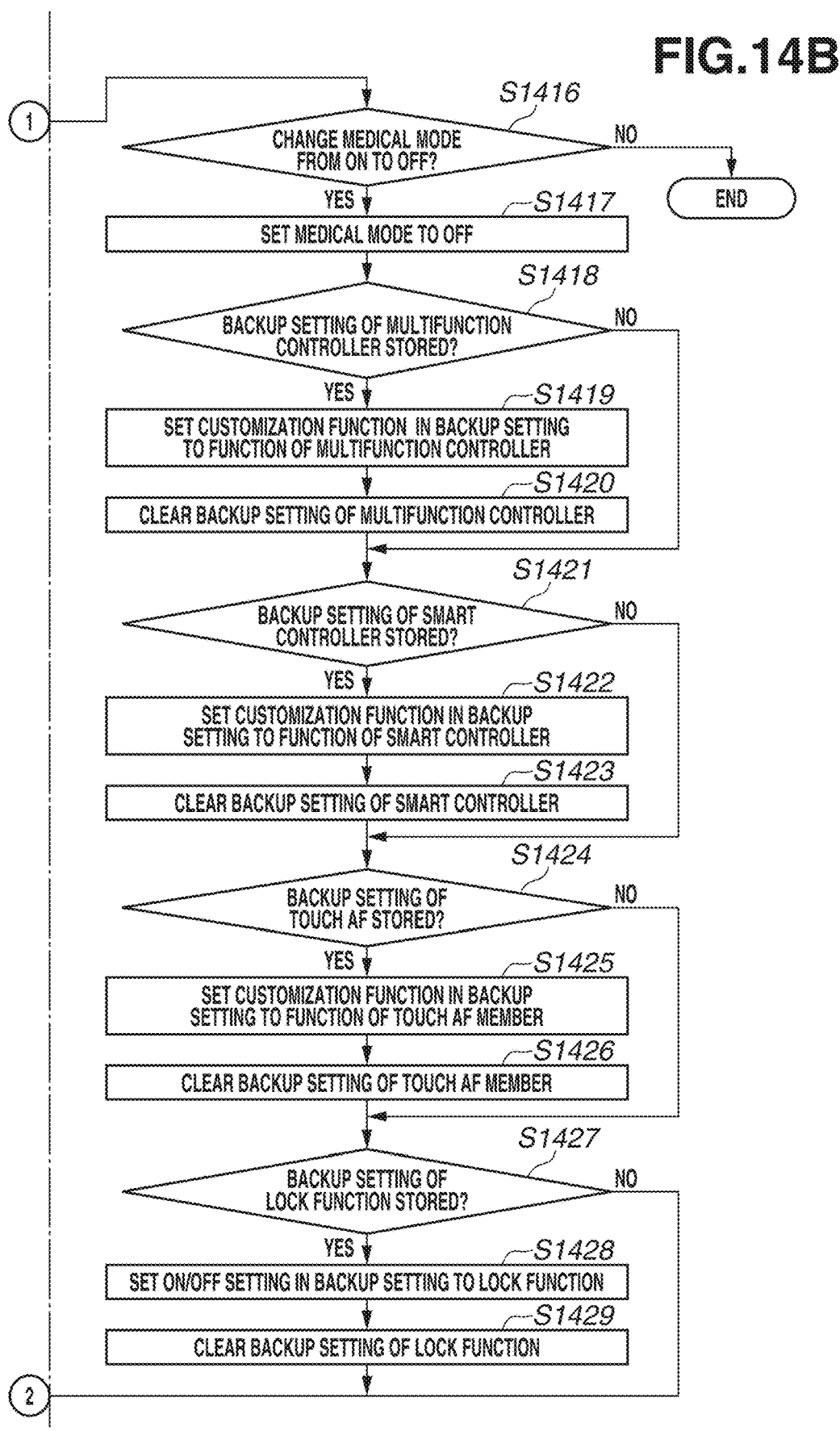

Hereinafter, processing of implementing an operation of switching between ON and OFF of the medical mode will be described with reference to FIGS. 14A and 14B. FIGS. 14A and 14B are flowcharts illustrating an example of a procedure of switching between ON and OFF of the medical mode according to an example embodiment of the present invention. Irrespective of whether the medical mode is set to ON or OFF, the processing of the flowchart is started by the user pressing the MENU button 81 of the operation members. Nevertheless, during the patient information acquisition processing, the user information acquisition processing, the region information acquisition processing, the affected area image capturing processing, the affected area image confirmation processing, or the affected area image retransmission processing, the start of the processing of the flowchart is disabled even when the user presses the MENU button. Each piece of processing in FIGS. 14A and 14B is implemented by the system control unit 50 loading a program stored in the nonvolatile memory 56 into the system memory 52 and executing the program.

In step S1401, the system control unit 50 determines whether the user has selected a medical mode item on a MENU screen. The selection is performed by a touching operation on a medical mode item or a pressing operation on the SET button 75 in a state in which a selection frame is set on a medical mode frame by a dial operation or a cross key operation. In a case where the medical mode item is selected (YES in step S1401), the processing proceeds to step S1402. In a case where the medical mode item is selected (NO in step S1401), the processing is ended.

In step S1402, the system control unit 50 displays ON and OFF as sub items of the medical mode item on the menu screen and determines whether a medical mode OFF state has been changed to a medical mode ON state. The system control unit 50 performs determination of whether a medical mode OFF state has been changed to a medical mode ON state, based on whether the user has selected the ON item. The selection is performed by a touching operation on the ON item or a pressing operation on the SET button 75 in a state in which a selection frame is set on the ON item by a dial operation or a cross key operation. In a case where the medical mode has been changed to ON (YES in step S1402), the processing proceeds to step S1403. In a case where the medical mode has not been changed to ON (NO in step S1402), the processing proceeds to step S1416.

In step S1403, the system control unit 50 sets the medical mode to ON. In a case where the medical mode becomes ON, the imaging apparatus operates in the medical mode to be described below. Thus, the system control unit 50 operates to switch the image capturing mode between a medical mode and a mode that is not the medical mode (e.g. normal image capturing mode) and so can operate to switch the image capturing mode to a medical mode.

In step S1404, the system control unit 50 determines whether the customization setting of the multifunction controller 84 is OFF. In a case where the customization setting is OFF (YES in step S1404), the processing proceeds to step S1405. In a case where the customization setting is not OFF (NO in step S1404), the processing proceeds to step S1407.

In step S1405, the system control unit 50 sets a backup setting of the multifunction controller 84 to OFF and stores the backup setting into the nonvolatile memory 56.

In step S1406, the system control unit 50 sets a customization setting of the multifunction controller 84 to AF frame direct selection. The leftmost item among customization setting items for the multifunction controller 84 that are settable in the medical mode as illustrated in FIG. 15B has been described as an example of a function to be set, but the function to be set needs not be the leftmost function.

In step S1407, the system control unit 50 determines whether the customization setting of the smart controller 86 is OFF. In a case where the customization setting is OFF (YES in step S1407), the processing proceeds to step S1408. In a case where the customization setting is not OFF (NO in step S1407), the processing proceeds to step S1410.

In step S1408, the system control unit 50 sets a backup setting of the smart controller 86 to OFF and stores the backup setting into the nonvolatile memory 56.

In step S1409, the system control unit 50 sets the customization setting of the smart controller 86 to AF frame direct selection. The leftmost item among customization setting items for the smart controller 86 settable in the medical mode as illustrated in FIG. 15E has been described as an example of a function to be set, but the function to be set needs not be the leftmost function.

In step S1410, the system control unit 50 determines whether the customization setting of the touch AF is OFF. In a case where the customization setting is OFF (YES in step S1410), the processing proceeds to step S1411. In a case where the customization setting is not OFF (NO in step S1410), the processing proceeds to step S1413.

In step S1411, the system control unit 50 sets a backup setting of the touch AF to OFF and stores the backup setting into the nonvolatile memory 56.

In step S1412, the system control unit 50 sets the customization setting of the touch AF to AF frame direct selection. An item to be set can be a different item.

In step S1413, the system control unit 50 checks whether a lock function of the operation members is ON. In a case where the lock function is ON (YES in step S1413), the processing proceeds to step S1414. In a case where the lock function is OFF (NO in step S1413), the processing ends.

In step S1414, the system control unit 50 sets a backup setting of the lock function to ON and stores the backup setting into the nonvolatile memory 56. Then, in step S1415, the system control unit 50 sets the lock function to OFF.

In the above described manner, in a case where the medical mode is switched to ON, a function related to AF is allocated to each operation of the multifunction controller 84, the smart controller 86, and the touch AF without changing a setting on each of the customization function setting screens. Because an imaging apparatus 100 is used without a strap wearable on the user's shoulder in a medical workplace, the lock function is switched to OFF to unlock the operation members in accordance with the medical mode being switched to ON. Because there is little concern about an erroneous operation in a medical workplace, the operation members are unlocked. Further, because capturing a clear affected area image is important in a medical workplace, in the medical mode, a function of selecting a focus position (AF frame) as a setting related to AF is especially allocated to the multifunction controller 84, the smart controller 86, and the touch AF to which a function related to AF is allocated.

In step S1416, the system control unit 50 displays ON and OFF as sub items of the medical mode item on the menu screen. Then, the system control unit 50 determines whether a medical mode state has been changed from the medical mode ON state to the medical mode OFF state. The system control unit 50 performs the determination of whether the medical mode ON state has been changed to the medical mode OFF state, based on whether the user has selected the OFF item. The selection is performed by a touching operation on the OFF item or a pressing operation on the SET button 75 in a state in which a selection frame is set on the OFF item by a dial operation or a cross key operation. In a case where the medical mode has been changed to OFF (YES in step S1416), the processing proceeds to step S1417. In a case the medical mode has not been changed to OFF (NO in step S1416), the processing ends.

In step S1417, the system control unit 50 sets the medical mode to OFF. In other words, the imaging apparatus 100 operates in the normal image capturing mode but not in the medical mode. In the normal image capturing mode, the imaging apparatus 100 performs exposure control and ranging control on a subject in accordance with the first shutter switch signal SW1 being turned ON as described above. Then, the imaging apparatus 100 executes an operation as a digital camera in the normal image capturing mode. More specifically, the imaging apparatus 100 captures an image in accordance with the second shutter switch signal SW2 being turned ON and records the captured image into the recording medium 200 as a still image file.

In step S1418, the system control unit 50 determines whether a backup setting of the multifunction controller 84 is stored. In a case where a backup setting is stored (YES in step S1418), the processing proceeds to step S1419. In a case where a backup setting is not stored (NO in step S1418), the processing proceeds to step S1421.

In step S1419, the system control unit 50 acquires, from the backup setting in the nonvolatile memory 56, a function for the multifunction controller 84 set before the medical mode is set to ON and sets the function as a customization function of the multifunction controller 84.

In step S1420, the system control unit 50 clears the backup setting of the multifunction controller 84.

In step S1421, the system control unit 50 determines whether a backup setting of the smart controller 86 is stored. In a case where a backup setting is stored (YES in step S1421), the processing proceeds to step S1422. In a case where a backup setting is not stored (NO in step S1421), the processing proceeds to step S1424.

In step S1422, the system control unit 50 acquires, from the backup setting in the nonvolatile memory 56, a function for the smart controller 86 set before the medical mode is set to ON and sets the function as a customization function of the smart controller 86.

In step S1423, the system control unit 50 clears the backup setting of the smart controller 86.

In step S1424, the system control unit 50 determines whether a backup setting of the touch AF is stored. In a case where a backup setting is stored (YES in step S1424), the processing proceeds to step S1425. In a case where a backup setting is not stored (NO in step S1424), the processing proceeds to step S1427.

In step S1425, the system control unit 50 acquires, from the backup setting in the nonvolatile memory 56, a function for the touch AF member set before the medical mode is set to ON and sets the function as a customization function of the touch AF.

In step S1426, the system control unit 50 clears the backup setting of the touch AF.

In step S1427, the system control unit 50 determines whether a backup setting of the lock function is stored. In a case where a backup setting is stored (YES in step S1427), the processing proceeds to step S1428. In a case where a backup setting is not stored (NO in step S1427), the processing ends.

In step S1428, the system control unit 50 acquires, from the backup setting, an ON/OFF setting of the lock function that is set before the medical mode is set to ON and sets the acquired ON/OFF setting to the lock function.

In step S1429, the system control unit 50 clears the backup setting of the lock function.

In the above-described manner, in a case where a medical mode setting is switched from ON to OFF, a customization setting and the lock function are set to settings set before the medical mode is set to ON, by using the backup settings.

<Live View Screen Display>

Figure 3A:
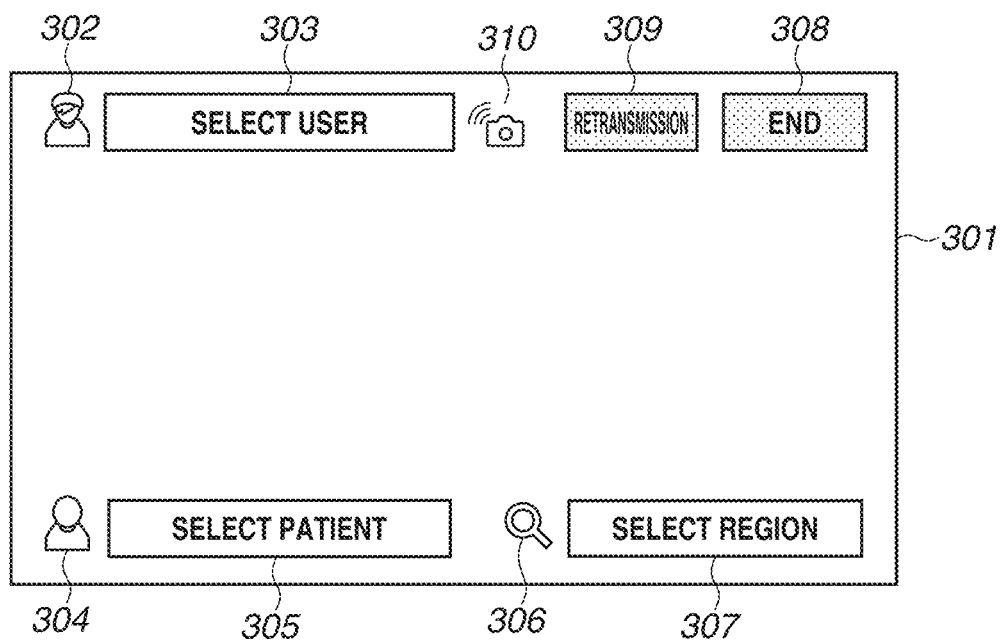
FIGS. 3A and 3B are diagrams each illustrating an example of a live view screen that is displayed in a medical mode.
Figure 3B:
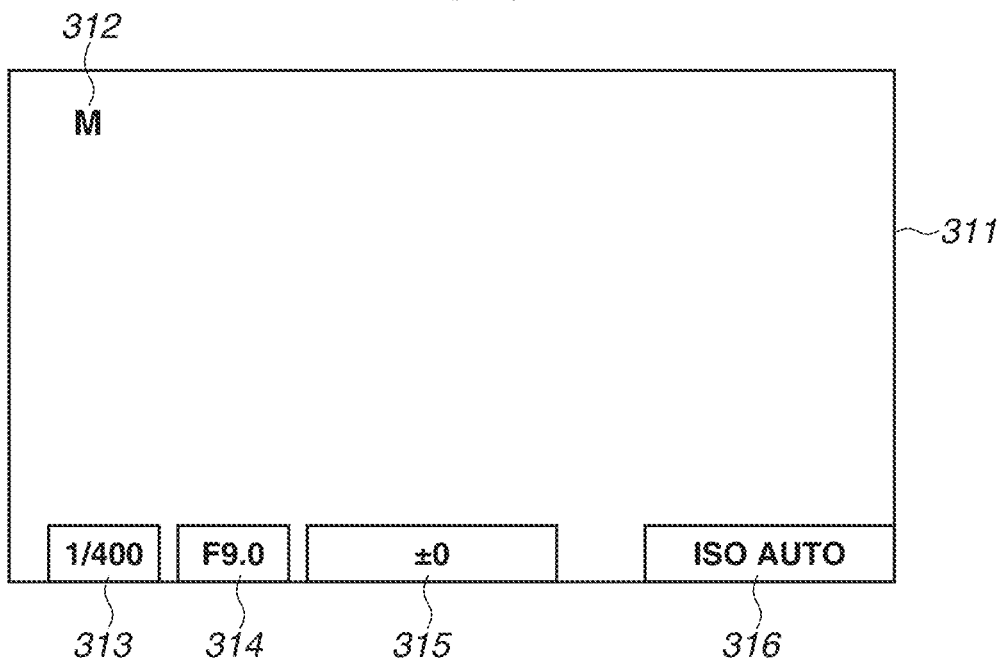

FIGS. 3A and 3B each illustrate an example of a live view screen that is displayed on the display unit 28 according to the present example embodiment when the digital camera 100 is in an imaging standby state while the medical mode is set to ON.

A LV display setting includes medical information display and imaging parameter display. By the user pressing the display switching button 83, the LV display setting can be switched between the medical information display and the imaging parameter display.

FIG. 3A illustrates an example of a live view screen that is displayed when the LV display setting is set to the medical information display.

A live view image captured by the imaging unit 22 is displayed in an area 301. Icons 302, 304, 306 and 310, text boxes (display frames) 303, 305 and 307, and buttons 308 and 309 are displayed in a superimposed manner on the live view image.

The icon 302 indicates a user and shows that information in the text box 303 next to the icon 302 is about the user. After user information is acquired in the user information acquisition processing in step S410, the icon 302 can be changed to an icon based on the acquired user information.

The text box 303 is a display frame for user information display. By a touching operation on the text box 303 for user information or a pressing operation on the SET button 75 after a selection frame (cursor) is moved to the text box 303 for user information by a dial operation or a cross key operation, the processing transitions to the user information acquisition processing in step S410. In a case where user information is not set, a message "select user" as illustrated in FIG. 3A is displayed to notify that a user is unset. After user information is acquired in the user information acquisition processing in step S410, user information (user name) is displayed in the text box 303 for user information.

The icon 304 indicates a patient and shows that information in the text box 305 next to the icon 304 is about the patient. After patient information is acquired in the patient information acquisition processing in step S408, the icon 304 can be changed to an icon based on the acquired patient information. As an example, the icon 304 can be changed to an icon based on the gender or age of the patient.

The text box 305 is a display frame for patient information display. By a touching operation on the text box 305 for patient information or a pressing operation on the SET button 75 after a selection frame (cursor) is moved to the text box 305 for patient information by a dial operation or a cross key operation, the processing transitions to the patient information acquisition processing in step S408. In a case where patient information is not set, a message "select patient" as illustrated in FIG. 3A is displayed to notify that a patient is unset. After patient information is acquired in the patient information acquisition processing in step S408, the acquired patient information (patient name) is displayed in the text box 305 for patient information. Because patient information is important information that must not be mistaken, not only a patient name but also gender and age can be displayed.

The icon 306 indicates a region and shows that information in the text box 307 next to the icon 306 is about selection of the region. After region information is acquired in the region information acquisition processing in step S412, the icon 306 can be switched to an icon based on the acquired region information.

The text box 307 is a display frame for region information display. By a touching operation on the text box 307 for region information or a pressing operation on the SET button 75 after a selection frame (cursor) is moved to the text box 307 for region information by a dial operation or a cross key operation, the processing transitions to the region information acquisition processing in step S412. In a case where region information is not set, a message "select region" as illustrated in FIG. 3A is displayed to notify that a region is unset. After region information is acquired in the region information acquisition processing in step S412, the acquired region information (region name) is displayed in the text box 307 for region information.

When the user fully presses the shutter button 61 during display of the live view screen, the processing transitions to the affected area image capturing processing in step S425. In the affected area image capturing processing in step S425, image capturing is performed, and the obtained image data is recorded in association with user information, patient information, and region information displayed in the text boxes 303, 305, and 307, respectively, and the image data is transmitted to the in-hospital system 1802.

The button 308 is an end button. When the user ends the capturing of a necessary number of images of an affected area of a patient, the user presses the button 308. A pressing operation on the button 308 transitions the processing to the affected area image confirmation processing in step S427, and then when the user selects an OK button or a cancel button, a result of the selection is transmitted to the in-hospital system 1802. The pressing operation on the button 308 can clear the settings of the text box 303 for user information, the text box 305 for patient information, and the text box 307 for region information.

A button 309 is a retransmission button. A touching operation on the button 309 for retransmission on the screen or a pressing operation on the SET button 75 after a selection frame is moved to the button 309 for retransmission by a dial operation transitions the processing to the affected area image retransmission processing in step S429. In the affected area image retransmission processing in step S429, retransmission of image data that has failed to be transmitted to the in-hospital system 1802 even though the user selects an OK button in the affected area image confirmation processing in step S427 is performed.

The icon 310 is an icon indicating a communication state. The icon 310 displays whether the imaging apparatus 100 has not been connected with the in-hospital system 1802 (server 1801) or has been connected with the in-hospital system 1802 (server 1801).

FIG. 3B illustrates an example of a live view screen that is displayed when the LV display setting is set to imaging parameter display. A live view image of a subject is displayed in an area 311. In a case where the LV display setting is set to the imaging parameter display, the following information regarding an image capturing setting is displayed together with a live view image (live image). An icon 312 is an image capturing mode icon indicating an image capturing mode. An item 313 indicates a setting value of a shutter speed. An item 314 indicates an aperture value. An item 315 indicates an exposure compensation value. An item 316 indicates an ISO value.

In the above-described manner, in a case where the LV display setting is set to the imaging parameter display, currently-set various imaging parameters (the setting of an image capturing mode and setting values of various imaging parameters) are displayed. In the imaging parameter display, the button 308 for an end of image capturing, the button 309 for retransmission, and the icon 310 indicating the communication state that are displayed when the LV display setting is set to the medical information display can also be displayed in the medical mode.

<Processing in Medical Mode>

Figure 4A:
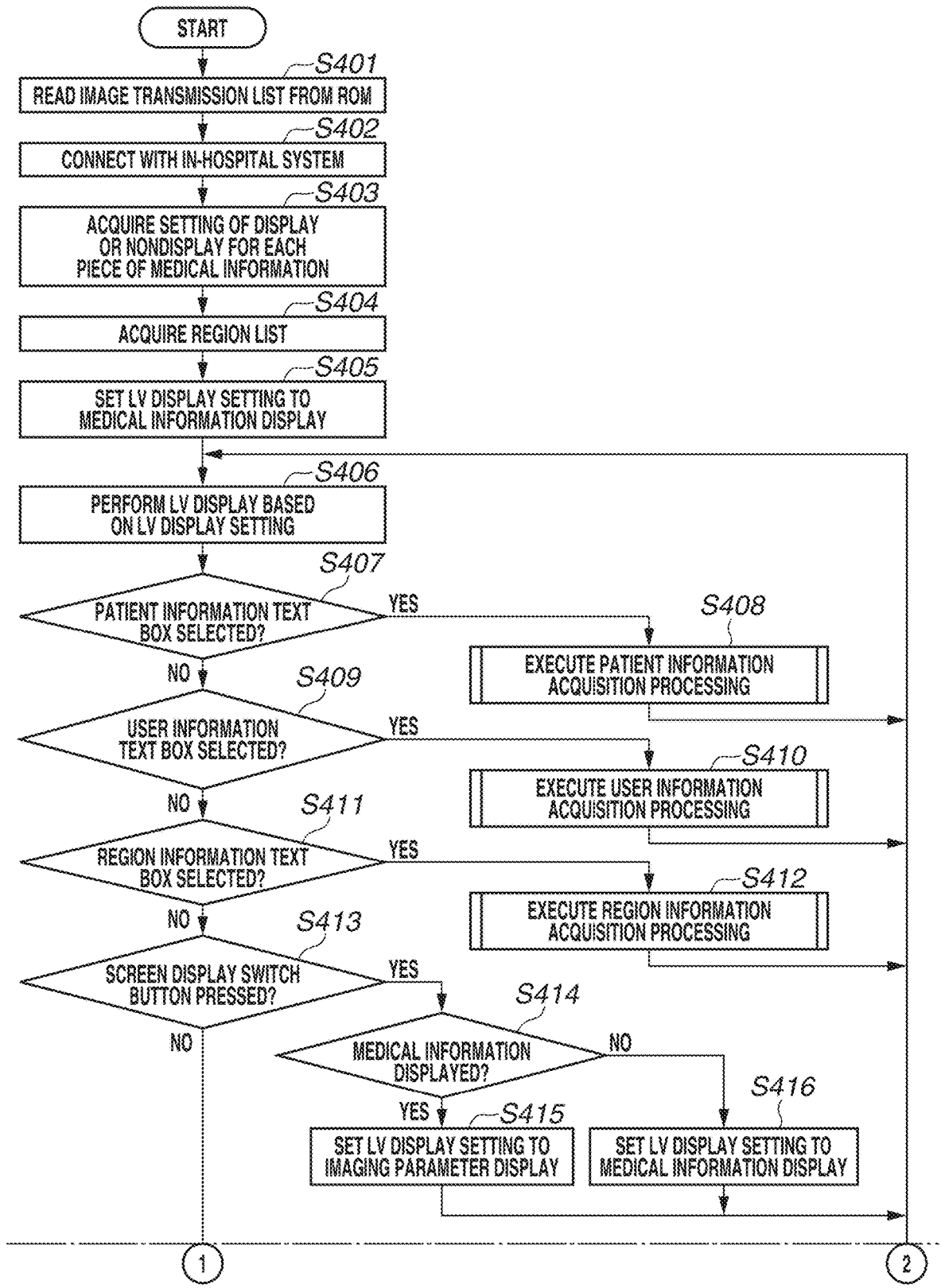
FIGS. 4A and 4B are flowcharts illustrating processing that is executed in the medical mode.
Figure 4B:
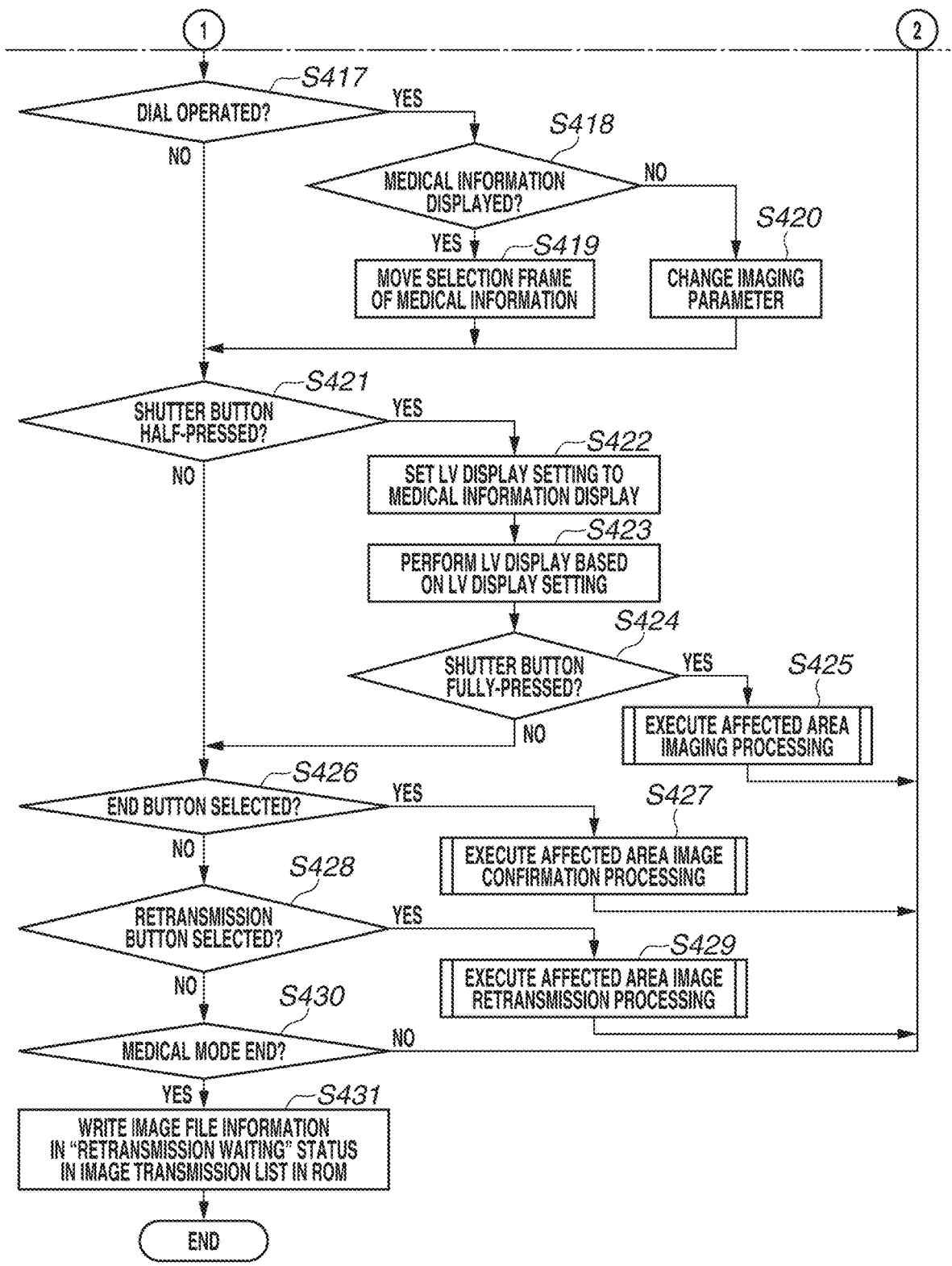

Hereinafter, the processing that is executed by the imaging apparatus 100 in the medical mode according to an example embodiment of the present invention will be described with reference to FIGS. 4A and 4B. FIGS. 4A and 4B are diagrams of a flowchart illustrating processing that is executed by the imaging apparatus 100 from a start to an end of the medical mode. The medical mode is started by the user turning the power ON in a state in which the medical mode is set to ON or the user switching the setting of the medical mode from OFF to ON. Each piece of processing in FIGS. 4A and 4B is implemented by the system control unit 50 loading a program stored in the nonvolatile memory 56 into the system memory 52 and executing the program when the power switch 72 is turned on. Each piece of processing in FIGS. 6, 8, 9, 11A and 11B, and 13, which indicate sub procedures of the flowchart illustrated in FIGS. 4A and 4B, is implemented by the system control unit 50 loading a program stored in the nonvolatile memory 56 into the system memory 52 and executing the program.

In step S401, the system control unit 50 reads an image transmission list from the nonvolatile memory 56. The image transmission list is to be used to retransmit unsent image data in the affected area image retransmission processing in step S429 if any image data has failed to be transmitted when the imaging apparatus 100 has operated in the medical mode the last time.

In step S402, the system control unit 50 connects with the in-hospital system 1802 via the communication unit 54. In the present example embodiment, the system control unit 50 wirelessly connects to the in-hospital system 1802 via the server 1801 as illustrated in FIG. 18. Alternatively, the system control unit 50 can connect to the in-hospital system 1802 via a cable.

In step S403, the system control unit 50 acquires a setting of display or nondisplay for each piece of medical information (user information, patient information, region information) from the in-hospital system 1802. The setting is to be used to switch between display and nondisplay of medical information indicated by the icons 302, 304, and 306 and text boxes 303, 305, and 307.

In step S404, the system control unit 50 acquires, from the in-hospital, a list of regions to be selected by the user in the system region information acquisition processing.

In step S405, the system control unit 50 sets the LV display setting to medical information display. This is because the medical information display as illustrated in FIG. 3A is performed in a default state of the medical mode. For this reason, in a case where the power is turned on when the medical mode is set to ON or when the mode is switched to the medical mode, the live view screen is initially displayed in the medical information display as illustrated in FIG. 3A.

In step S406, when the LV display setting is set to the medical information display, the system control unit 50 displays medical information (patient information, user, region information) as illustrated in FIG. 3A, and when the LV display setting is set to the imaging parameter display, the system control unit 50 displays specific imaging parameters as illustrated in FIG. 3B.

In step S407, the system control unit 50 determines whether the user has selected the text box 305 for patient information on the screen. The selection is performed by either of a touching operation on the text box 305 or a pressing operation on the SET button 75 in a state in which a selection frame is set on the text box 305 for patient information by a dial operation or a cross key operation to be described below. The dial operation is an operation on the main electronic dial 71 or the sub electronic dial 73, and the cross key operation is an operation on the four directional key 74. In a case where the text box 305 for patient information has been selected (YES in step S407), the processing proceeds to step S408. In a case where the text box 305 for patient information has not been selected (NO in step S407), the processing proceeds to step S409.

In step S408, the system control unit 50 executes the patient information acquisition processing to receive patient information from the in-hospital system 1802 by transmitting, to the in-hospital system 1802, a barcode image of a patient whose image has been captured by the imaging unit 22. The patient information to be acquired from the in-hospital system 1802 includes a patient name, a patient ID, age, and gender. Alternatively, as another configuration, the system control unit 50 can analyze a captured barcode image, transmit analyzed barcode information to the in-hospital system 1802, and receive patient information from the in-hospital system 1802. The patient information acquisition processing will be described in detail below.

In step S409, the system control unit 50 determines whether the user has selected the text box 303 for user information on the screen. The selection is performed by either of a touching operation on the text box 303 or a pressing operation on the SET button 75 in a state in which a selection frame is set on the text box 303 for user information by a dial operation or a cross key operation. In a case where the text box 303 for user information has been selected (YES in step S409), the processing proceeds to step S410. In a case where the text box 303 for user information has not been selected (NO in step S409), the processing proceeds to step S411.

In step S410, the system control unit 50 executes the user information acquisition processing to receive user information from the in-hospital system 1802 by transmitting a barcode image of a user (doctor or nurse) to the in-hospital system 1802. The user information includes a user name, a user ID, and a name of a department to which the user belongs. Alternatively, as another configuration, the system control unit 50 can analyze a captured barcode image, transmit analyzed barcode information to the in-hospital system 1802, and receive user information from the in-hospital system 1802. The user information acquisition processing will be described in detail below.

In step S411, the system control unit 50 determines whether the user has selected the text box 307 for region information on the screen. The selection is performed by a pressing operation on the text box 307 or a pressing operation on the SET button 75 in a state in which a selection frame is set on the text box 307 for region information by a dial operation or a cross key operation. In a case where the text box 307 for region information has been selected (YES in step S411), the processing proceeds to step S412. In a case where the text box 307 for region information has not been selected (NO in step S411), the processing proceeds to step S413.

In step S412, the system control unit 50 displays the region list acquired in step S404 and prompts the user to select a region from the region list, to execute the region information acquisition processing to determine region information. The region information acquisition processing will be described in detail below.

The processing in steps S407 to S412 is executed in a case where the LV display setting is set to the medical information display in which the text box 303 for user information, the text box 305 for patient information, and the text box 307 for region information are displayed. In a case where the LV display setting is set to the imaging parameter display, because the text box 303 for user information, the text box 305 for patient information, and the text box 307 for region information are not displayed, the processing in steps S407 to S412 is not executed. In other words, while medical information can be changed in accordance with a user operation in a case where the LV display setting is set to the medical information display, medical information cannot be changed in accordance with a user operation in a case where the LV display setting is set to the imaging parameter display.

In step S413, the system control unit 50 determines whether the user has pressed the display switching button 83. In a case where the user has pressed the display switching button 83 (YES in step S413), the processing proceeds to step S414. In a case where the user has not pressed the display switching button 83 (NO in step S413), the processing proceeds to step S417.

In step S414, the system control unit 50 determines whether the LV display setting is set to the medical information display. In a case where the LV display setting is set to the medical information display (YES in step S414), the processing proceeds to step S415. In a case where the LV display setting is not set to the medical information display (NO in step S414), the processing proceeds to step S416.

In step S415, the system control unit 50 sets the LV display setting to the imaging parameter display, and then the processing returns to step S406. In this case, because the LV display setting is changed from the medical information display to the imaging parameter display, in step S406, LV display is changed to the display including imaging parameter information together with a live view image as illustrated in FIG. 3B.

In step S416, the system control unit 50 sets the LV display setting to the medical information display, and then the processing returns to step S406. In this case, because the LV display setting is changed from the imaging parameter display to the medical information display, in step S406, LV display is changed to the display including medical information together with a live view image as illustrated in FIG. 3A. In step S417, the system control unit 50 determines whether the user has performed a dial operation on the main electronic dial 71 or the sub electronic dial 73. In a case where the user has performed a dial operation (YES in step S417), the processing proceeds to step S418. In a case where the user has not performed a dial operation (NO in step S417), the processing proceeds to step S421.

In step S418, the system control unit 50 determines whether the LV display setting is set to the medical information display. In a case where the LV display setting is set to the medical information display (YES in step S418), the processing proceeds to step S419. In a case where the LV display setting is not set to the medical information display (NO in step S418), the processing proceeds to step S420.

In step S419, the system control unit 50 moves a selection frame for medical information. The selection frame for medical information is displayed on either one of the text box 303 for user information, the text box 305 for patient information, and the text box 307 for region information, and moves in the order of the text box 303 for user information, the text box 305 for patient information, and the text box 307 for region information. Next to the text box 307 for region information, the selection frame moves to the text box 303 for user information. In a case where the selection frame moving operation is performed during a half press operation on the shutter button 61, the movement of the selection frame of medical information can be enabled. During the medical information display, not only by a dial operation, the selection frame for medical information can also be moved by a cross key operation similarly to a dial operation.

In step S420, the system control unit 50 changes imaging parameters. As an example, the imaging parameters include a shutter speed, an aperture value, an exposure compensation value, and an ISO value. For each image capturing mode, the imaging parameters are individually allocated to the main electronic dial 71 and the sub electronic dial 73. For example, in a case where the image capturing mode is a Tv mode, a setting value of a shutter speed is changed in accordance with an operation on the main electronic dial 71, and in a case where the image capturing mode is an Av mode, a setting value of an aperture value is changed in accordance with an operation on the main electronic dial 71.

In the above-described manner, during the medical information display, the selection frame of medical information is moved in accordance with a dial operation, and during the imaging parameter display, a setting value of an imaging parameter for each of the image capturing modes allocated to the dials 71 and 73 is changed in accordance with a dial operation. In a case where a function of an imaging parameter change is allocated to a different operation member, such as the touch bar 82, an imaging parameter can be made changeable irrespective of the LV display setting. In this case, even in a case where the LV setting is set to the medical information display, an imaging parameter can be changed in accordance with a user operation.

In step S421, the system control unit 50 determines whether the user has half pressed the shutter button 61 (i.e., the first shutter switch signal SW1 has been output). In a case where the user has half pressed the shutter button 61 (YES in step S421), the processing proceeds to step S422. In a case where the user has not half pressed the shutter button 61 (NO in step S421), the processing proceeds to step S426.

In step S422, the system control unit 50 sets the LV display setting to the medical information display. Also in the medical mode, similarly to the normal image capturing mode, an imaging preparation operation is executed in accordance with a half-press operation of the shutter button 61.

Because the LV display setting has been changed to the medical information display in step S422, in step S423, the system control unit 50 changes the display to the medical information display as illustrated in FIG. 3A.

As described above, in the imaging apparatus 100 according to the present example embodiment, in a case where the shutter button 61 has been half pressed, even if the LV display setting is set to the imaging parameter display setting, the imaging parameter display is switched to the medical information display and live view display is performed. Accordingly, a user can confirm medical information before image capturing, whereby an inputting error of medical information can be prevented. In the present example embodiment, the LV display setting is changed to the medical information display in accordance with the half press of the shutter button 61. Alternatively, the setting of the LV display setting can be configured to be temporarily changed to the medical information display while the shutter button 61 is being half pressed. In this case, in accordance with the detachment of a finger from the shutter button 61, the display returns to the display based on the LV display setting set before the shutter button 61 is half pressed.

In step S424, the system control unit 50 determines whether the user has fully pressed the shutter button 61. More specifically, the system control unit 50 determines whether the second shutter switch signal SW2 has been output. In a case where the user has fully pressed the shutter button 61 (YES in step S424), the processing proceeds to step S425. In a case where the user has not fully pressed the shutter button 61 (NO in step S424), the processing proceeds to step S426.

In step S425, the system control unit 50 executes the affected area image capturing processing by generating image data by performing image capturing, record medical information (user information, patient information, region information) and the image data in association with each other, and transmitting the image data to the in-hospital system 1802. The affected area image capturing processing will be described in detail below.

In step S426, the system control unit 50 determines whether the user has selected the button 308 to end the processing on the screen. Alternatively, the system control unit 50 can determine whether the user has pressed the SET button 75 in a state in which a selection frame is set on the button 308 by a dial operation or a cross key operation. Alternatively, in a case where the end button function is allocated to a specific operation member, the system control unit 50 can determine whether the user has operated the specific operation member to which the end button function is allocated. In a case where the button 308 has been selected (YES in step S426), the processing proceeds to step S427. In a case where the button 308 has not been selected (NO in step S426), the processing proceeds to step S428.

In step S427, the system control unit 50 executes the affected area image confirmation processing by prompting the user to confirm an affected area image and select either the OK button or the cancel button and transmitting a result of the selection to the in-hospital system 1802 via the communication unit 54. The affected area image confirmation processing will be described in detail below.

In step S428, the system control unit 50 determines whether the user has selected the button 309 for retransmission on the screen. Alternatively, the system control unit 50 can determine whether the user has pressed the SET button 75 in a state in which a selection frame is set on the button 309 for retransmission by a dial operation or a cross key operation. Alternatively, in a case where the retransmission button function is allocated to a specific operation member, the system control unit 50 can determine whether the user has pressed the specific operation member to which the retransmission button function is allocated. In a case where the button 309 for retransmission has been selected (YES in step S428), the processing proceeds to step S429. In a case where the button 309 for retransmission has not been selected (NO in step S428), the processing proceeds to step S430.

In step S429, the system control unit 50 executes the affected area image retransmission processing by determining an image that has failed to be transmitted in step S425, from among images in the image transmission list for which the OK button has been selected in the affected area image confirmation processing in step S427 and retransmitting the determined image to the in-hospital system 1802 via the communication unit 54. The affected area image retransmission processing will be described in detail below.

In step S430, the system control unit 50 determines whether the user has ended the medical mode by switching the medical mode to OFF or turning the power OFF. In a case where the user has ended the medical mode (YES in step S430), the processing proceeds to step S431. In a case where the user has not ended the medical mode (NO in step S430), the processing returns to step S406.

In step S431, the system control unit 50 writes, in the nonvolatile memory 56, image file information in a "retransmission waiting" status in the image transmission list. In a case where the power is turned OFF, it is desirable that a current mode (medical mode/normal image capturing mode) is also written into the nonvolatile memory 56, and when the power is turned ON next time, an operation is started in the mode set when the power is turned OFF.

<Patient Information Acquisition Processing/User Information Acquisition Processing>

Figure 5A:
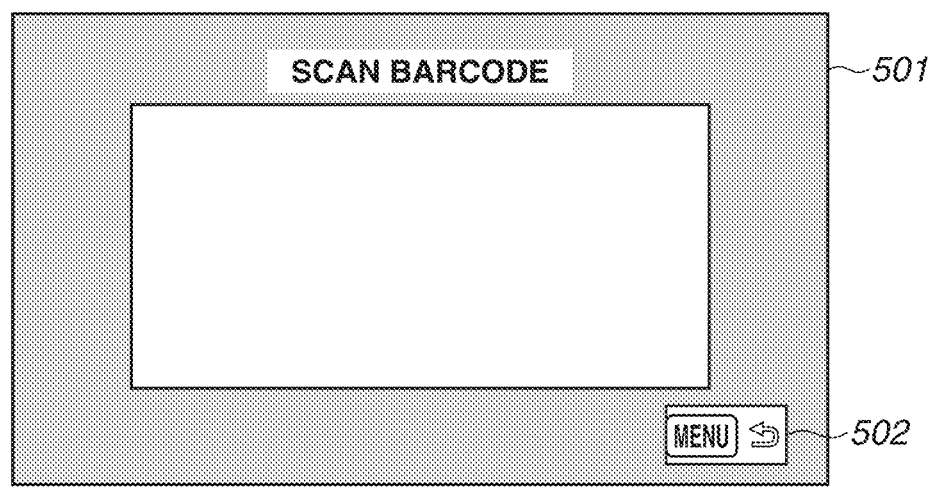
FIGS. 5A to 5C are diagrams each illustrating an example of a screen that is displayed in patient information acquisition processing or user information acquisition processing.
Figure 5B:
Figure 5C:
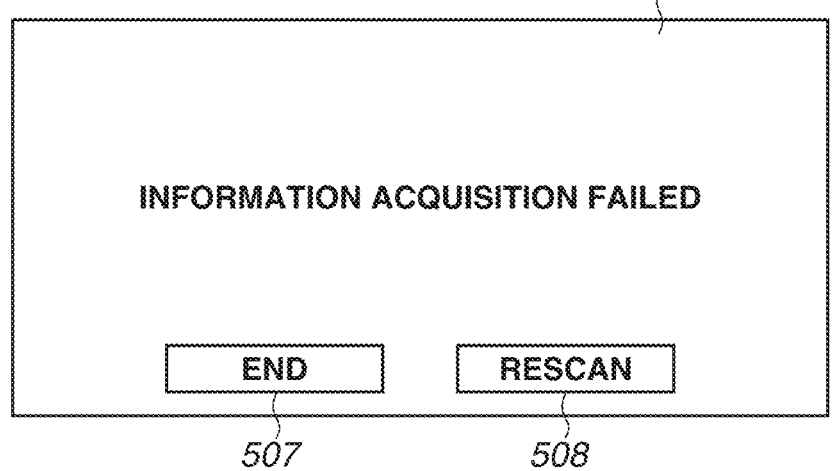

FIGS. 5A to 5C illustrate examples of screens that are displayed in the patient information acquisition processing in step S408 and the user information acquisition processing in step S410, according to the present example embodiment.

FIG. 5A illustrates an example of a barcode acquisition screen.

A live view image is displayed in an area 501. As illustrated in FIG. 5A, a frame of a region to capture a barcode image and a message "SCAN BARCODE" to prompt the user to perform barcode image capturing can be displayed together with the live view image.

A MENU button 502 is a button to close the barcode acquisition screen and also notifies that pressing of the MENU button 502 can close the barcode acquisition screen.

FIG. 5B illustrates an example of an information confirmation screen to prompt the user to confirm information received in step S605 to be described below.

Received information (either patient information or user information) 503, an OK button 504, and a rescan button 505 are displayed on the information confirmation screen.

The OK button 504 is a button that is used when the user selects OK after confirmation of the received information.

The rescan button 505 is a button that is used when the user selects whether to perform image capturing again.

FIG. 5C illustrates an example of an error screen that is displayed in a case where information has failed to be properly received.

A message 506 notifying the user of an error, an end button 507, and a rescan button 508 are displayed on the error screen. A wording of the message 506 can be changed in accordance with the type of the error.

Figure 6:
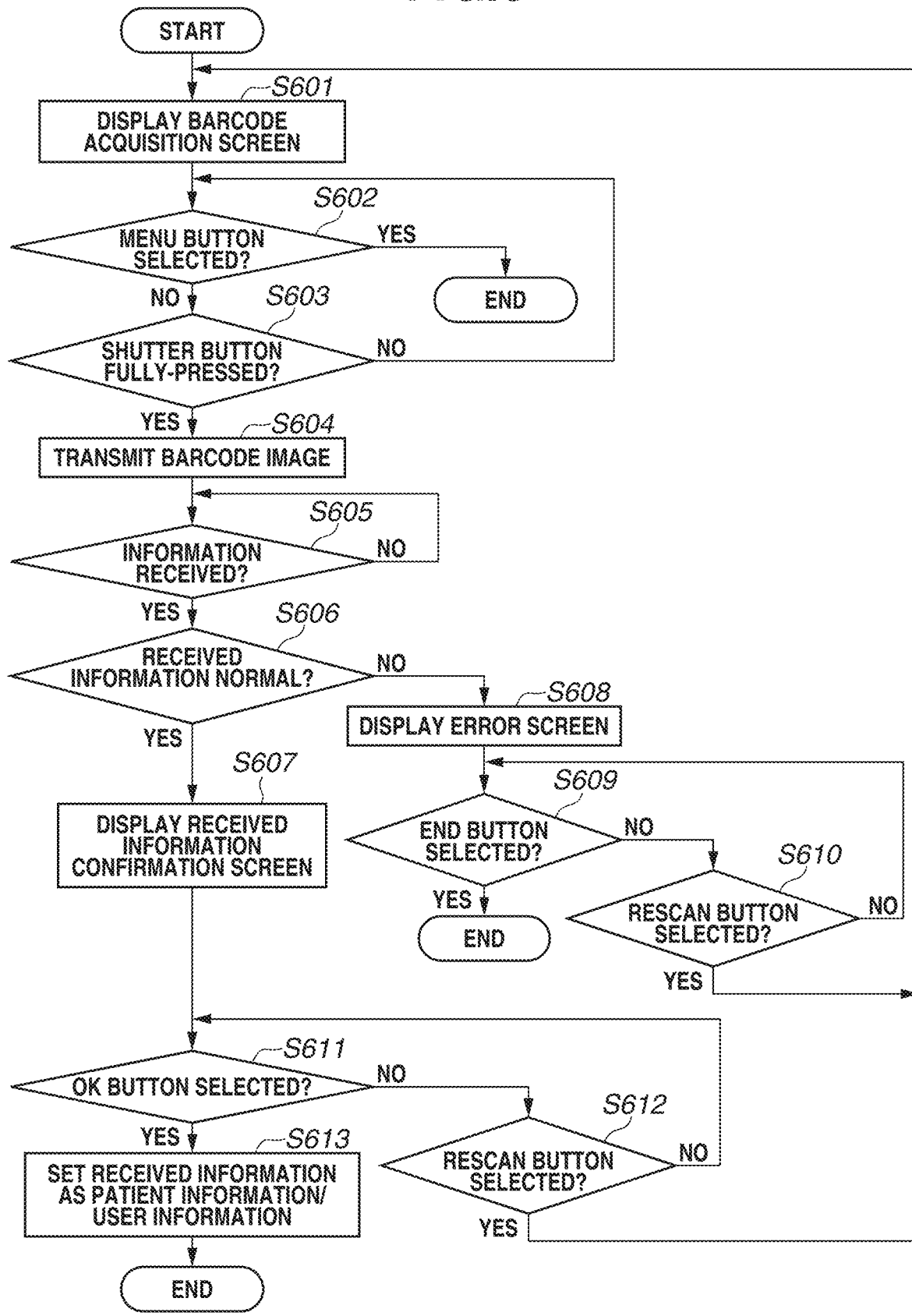
FIG. 6 is a flowchart of the patient information acquisition processing.

Hereinafter, the patient information acquisition processing (step S408) and the user information acquisition processing (step S410) will be described with reference to FIG. 6. Because basic operations in the patient information acquisition processing and the user information acquisition processing are the same, the patient information acquisition processing and the user information acquisition processing will be described with reference to one flowchart.

In step S601, the system control unit 50 displays the barcode acquisition screen as illustrated in FIG. 5A.

In step S602, the system control unit 50 determines whether the user has selected the MENU button 502 on the screen. The selection is performed by a touching operation on the MENU button 502 or a pressing operation on the MENU button 81 of the operation member. In a case where the MENU button has been selected (YES in step S602), the processing ends. In a case where the MENU button has not been selected (NO in step S602), the processing proceeds to step S603.

In step S603, the system control unit 50 determines whether the user has fully pressed the shutter button 61. In a case where the user has fully pressed the shutter button 61 (YES in step S603), the processing proceeds to step S604. In a case where the user has not fully pressed the shutter button 61 (NO in step S603), the processing returns to step S602.

In step S604, the system control unit 50 captures a barcode image using the imaging unit 22 and transmits the captured barcode image to the in-hospital system 1802 via the communication unit 54. The system control unit 50 can acquire a barcode by analyzing a barcode image and transmit barcode information to the in-hospital system via the communication unit 54 without transmitting a barcode image.

In step S605, the system control unit 50 determines whether information has been received from the in-hospital system 1802. In a case where information has been received (YES in step S605), the processing proceeds to step S606. In a case where information has not been received (NO in step S605), the processing in step S605 is executed again.

In step S606, the system control unit 50 determines whether the received information is normal. In a case where the received information is normal (YES in step S606), the processing proceeds to step S607. In a case where the received information is not normal (NO in step S606), the processing proceeds to step S608.

In step S607, the system control unit 50 displays the information confirmation screen for the received information illustrated in FIG. 5B.

In step S608, the system control unit 50 displays the error screen illustrated in FIG. 5C.

In step S609, the system control unit 50 determines whether the user has selected the end button 507 on the screen The selection is performed by a touching operation on the end button 507 or a pressing operation on the SET button 75 in a state in which a selection frame is set on the end button 507 by a dial operation or a cross key operation. In a case where the end button 507 has been selected (YES in step S609), the processing ends. In a case where the end button has not been selected (NO in step S609), the processing proceeds to step S610.

In step S610, the system control unit 50 determines whether the user has selected the rescan button 508 on the screen. The selection performed by a touching operation on the rescan button 508 or a pressing operation on the SET button 75 in a state in which a selection frame is set on the rescan button 508 by a dial operation or a cross key operation. In a case where the rescan button 508 has been selected (YES in step S610), the processing returns to step S601. In a case where the rescan button 508 has not been selected (NO in step S610), the processing returns to step S609.

In step S611, the system control unit 50 determines whether the user has selected the OK button 504 on the screen. The selection is performed by a touching operation on the OK button 504 or a pressing operation on the SET button 75 in a state in which a selection frame is set on the OK button 504 by a dial operation or a cross key operation. In a case where the OK button 504 has been selected (YES in step S611), the processing proceeds to step S613. In a case where the OK button 504 has not been selected (NO in step S611), the processing proceeds to step S612.

In step S612, the system control unit 50 determines whether the user has selected the rescan button 508 on the screen. The selection is performed by a touching operation on the rescan button 508 or a pressing operation on the SET button 75 in a state in which a selection frame is set on the rescan button 508 by a dial operation or a cross key operation. In a case where the rescan button 508 has been selected (YES in step S612), the processing returns to step S601. In a case where the rescan button 508 has not been selected (NO in step S612), the processing returns to step S611.

In step S613, in a case where the system control unit 50 executes the patient information acquisition processing in step S408, the system control unit 50 sets the information received in step S605 as patient information, and in a case where the system control unit 50 executes the user information acquisition processing in step S410, the system control unit 50 sets the information received in step S605 as user information. As described above, because the patient information acquisition processing and the user information acquisition processing are executed in a case where the LV setting is set to the medical information display, when the processing ends, the screen returns to the medical information display screen illustrated in FIG. 3A. At this time, the information set in the processing is displayed in the text box 305 for patient information or the text box 303 for user information.

<Region Information Acquisition Processing>

Figure 7A:
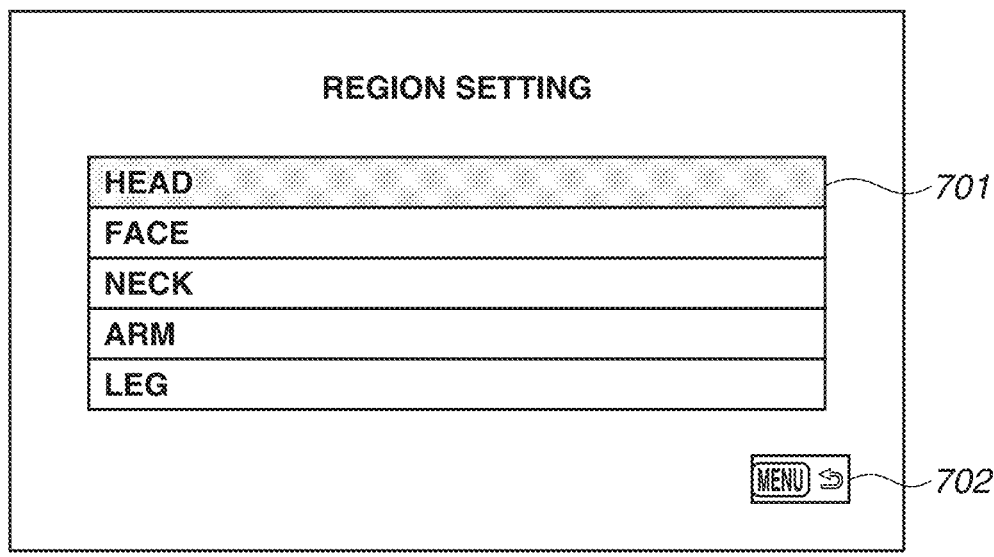
FIGS. 7A and 7B are diagrams each illustrating an example of a screen that is displayed in region information acquisition processing.
Figure 7B:
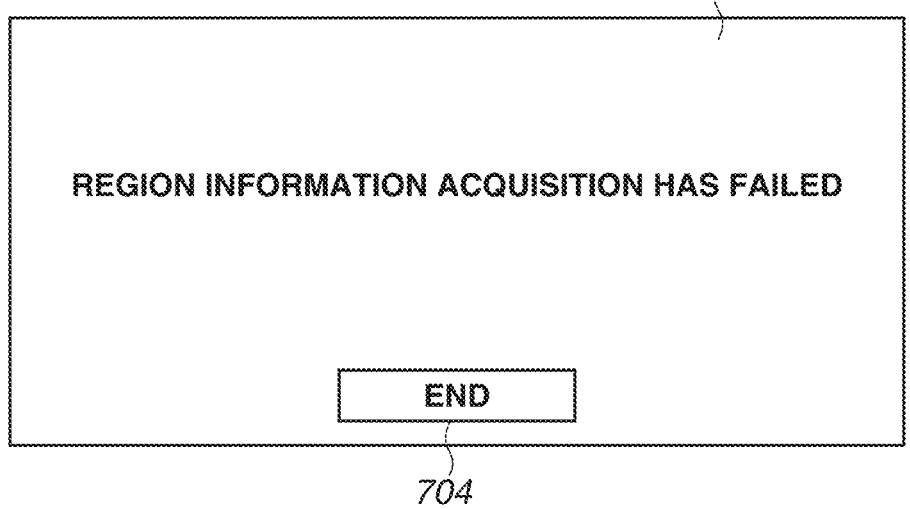

FIGS. 7A to 7B each illustrate an example of a screen that is displayed in the region information acquisition processing (step S412).

FIG. 7A illustrates an example of a region list selection screen.

A region list 701 and a MENU button 702 are displayed on the region list selection screen. The region list 701 is list display of the region list acquired in step S404. The MENU button 702 is a button to close the region list selection screen.

FIG. 7B illustrates an example of an error screen.

A message 703 notifying the user of an error and an end button 704 are displayed on the error screen. A wording of the message 703 can be changed in accordance with the type of an error.

Hereinafter, the region information acquisition processing in step S412 will be described with reference to FIG. 8.

In step S801, the system control unit 50 determines whether a region list has been acquired from the in-hospital system 1802 in step S404. In a case where a region list has been acquired (YES in step S801), the processing proceeds to step S802. In a case where a region list has not been acquired (NO in step S801), the processing proceeds to step S803.

In step S802, the system control unit 50 displays the region list selection screen illustrated in FIG. 7A. The region list acquired in step S404 is displayed in the region list 701.

In step S803, the system control unit 50 displays the error screen illustrated in FIG. 7B and ends the processing in accordance with the end button 704 being operated.

In step S804, the system control unit 50 determines whether the user has selected the MENU button 702 on the region list selection screen. The selection is performed by a touch operation on the MENU button 702 or a pressing operation on the MENU button 81 of the operation member. In a case where the MENU button has been selected (YES in step S804), the processing ends. In a case where the MENU button has not been selected (NO in step S804), the processing proceeds to step S805.

In step S805, the system control unit 50 determines whether the user has selected any region in the region list 701 on the region list selection screen. The selection is performed by a touching operation on any region in the region list 701 or a pressing operation on the SET button 75 in a state in which a selection frame is set on any region in the region list by a dial operation or a cross key operation. In a case where a region has been selected (YES in step S805), the processing proceeds to step S806. In a case where a region has not been selected (NO in step S805), the processing returns to step S804.

In step S806, the system control unit 50 sets the region selected by the user in step S805 as region information.

As described above, because the region information acquisition processing is executed in a case where the LV setting is set to the medical information display, when the processing ends, the screen returns to the medical information display screen illustrated in FIG. 3A. At this time, the region information set in the processing is displayed in the text box 307 for region information.

<Affected Area Image Capturing Processing>

Hereinafter, the affected area image capturing processing (step S425) will be described with reference to FIG. 9.

In step S901, the system control unit 50 captures an affected area image using the imaging unit 22 and acquires image data of the affected area image.

In step S902, the system control unit 50 displays the preview of the affected area image captured in step S901. In the preview display, set medical information (patient information, user information, region information) can be displayed in a superimposed manner. The display/nondisplay and a display time of the preview display can be changed in accordance with a user setting.

In step S903, the system control unit 50 stores medical information (patient information, user information, region information) into the nonvolatile memory 56 in association with the image data of the affected area image. The system control unit 50 can record the medical information into the recording medium 200 instead of the nonvolatile memory 56. In the present example embodiment, the system control unit 50 associates the medical information, as the attribute information of the image data, with the image data by storing the medical information into an image file in which the image data is recorded.

In step S904, the system control unit 50 transmits an image file including the image data of the affected area image and the medical information to the in-hospital system 1802 via the communication unit 54. While, in the present example embodiment, the medical information is included in the image file, the medical information can be stored as a file different from the image data, and the image file and the medical information file can be transmitted in association with each other.

In step S905, the system control unit 50 stores image file information and a "transmitting" status into the image transmission list stored in the nonvolatile memory 56. An image file name is used as an example of image file information to be stored.

In the above-described manner, in the affected area image capturing processing, an affected area image is captured and the captured affected area image data and medical information are transmitted to the in-hospital system 1802 in association with each other.

<Affected Area Image Confirmation Processing>

Figure 10:
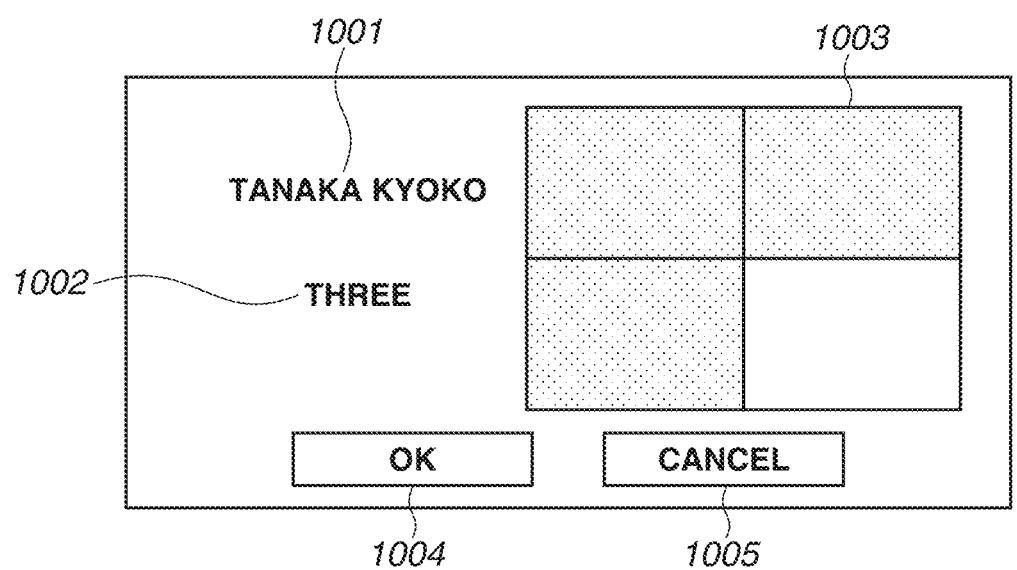
FIG. 10 is a diagram illustrating an example of a screen that is displayed in affected area image confirmation processing.

FIG. 10 illustrates an example of a screen that is displayed in the affected area image confirmation processing in step S427 according to the present example embodiment.

FIG. 10 illustrates an example of an affected area image confirmation screen. On the affected area image confirmation screen, the user confirms set medical information and image data which has been captured in step S901 and of which transmission has not been completed.

An item 1001 displays patient information (patient name) from among pieces of medical information associated with image data that is in the "transmitting" status in the image transmission list. In a case where a plurality of pieces of image data is in the "transmitting" status, medical information associated with image data of an image captured first or last can be displayed. Alternatively, medical information of all pieces of image data can be displayed.

An item 1002 displays the number of pieces of image data that are in the "transmitting" status in the image transmission list.

An area 1003 displays thumbnail images of image data that is in the "transmitting" status in the image transmission list. In a case where a plurality of pieces of image data in the "transmitting" status exists, a thumbnail image of image data of an image captured first or last can be displayed, or thumbnail images of all pieces of image data can be displayed as illustrated in FIG. 10.

An OK button 1004 and a cancel button 1005 are used when the user selects OK or cancel after confirmation of the medical information and the thumbnail image.

Figure 11A:
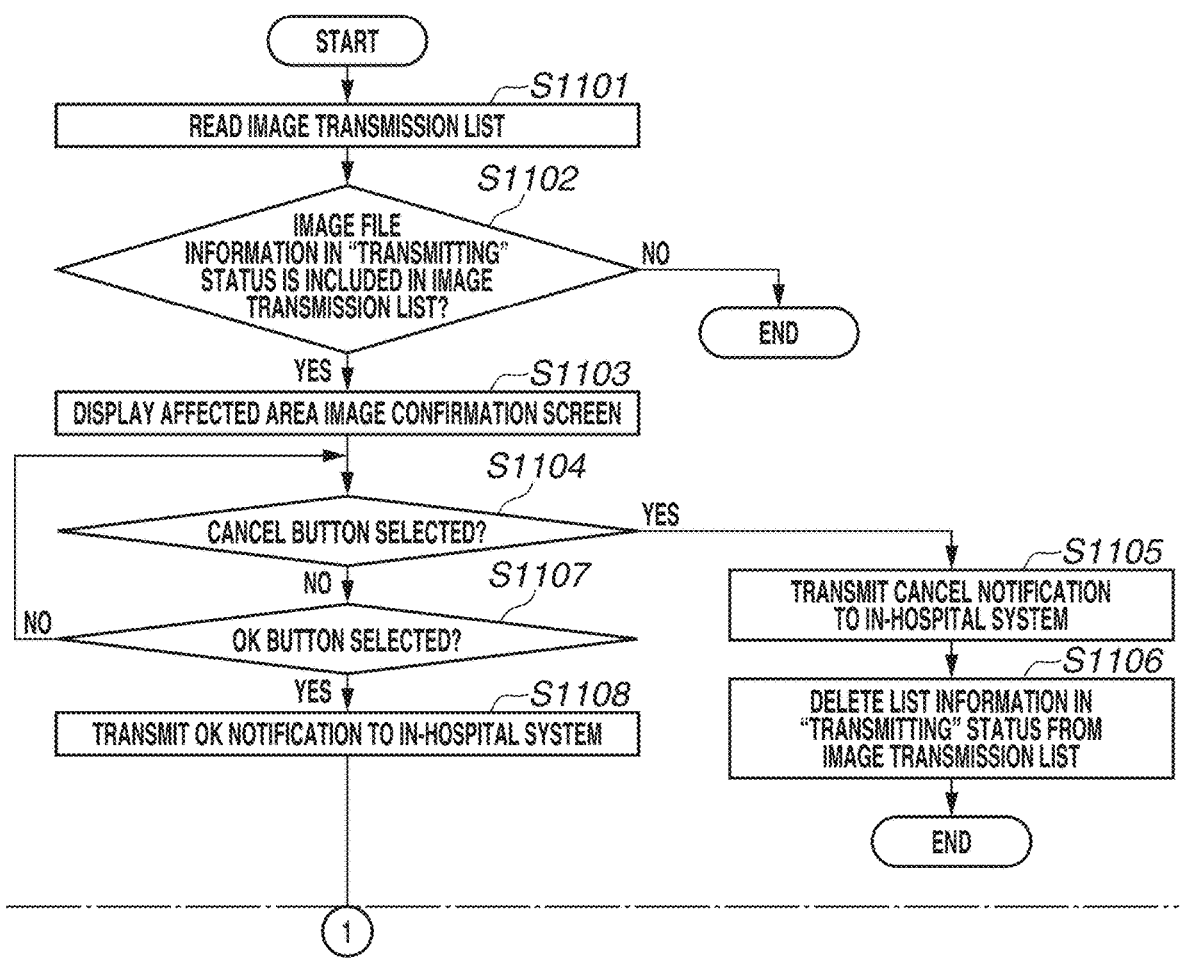
FIGS. 11A and 11B are flowcharts illustrating the affected area image confirmation processing.
Figure 11B:
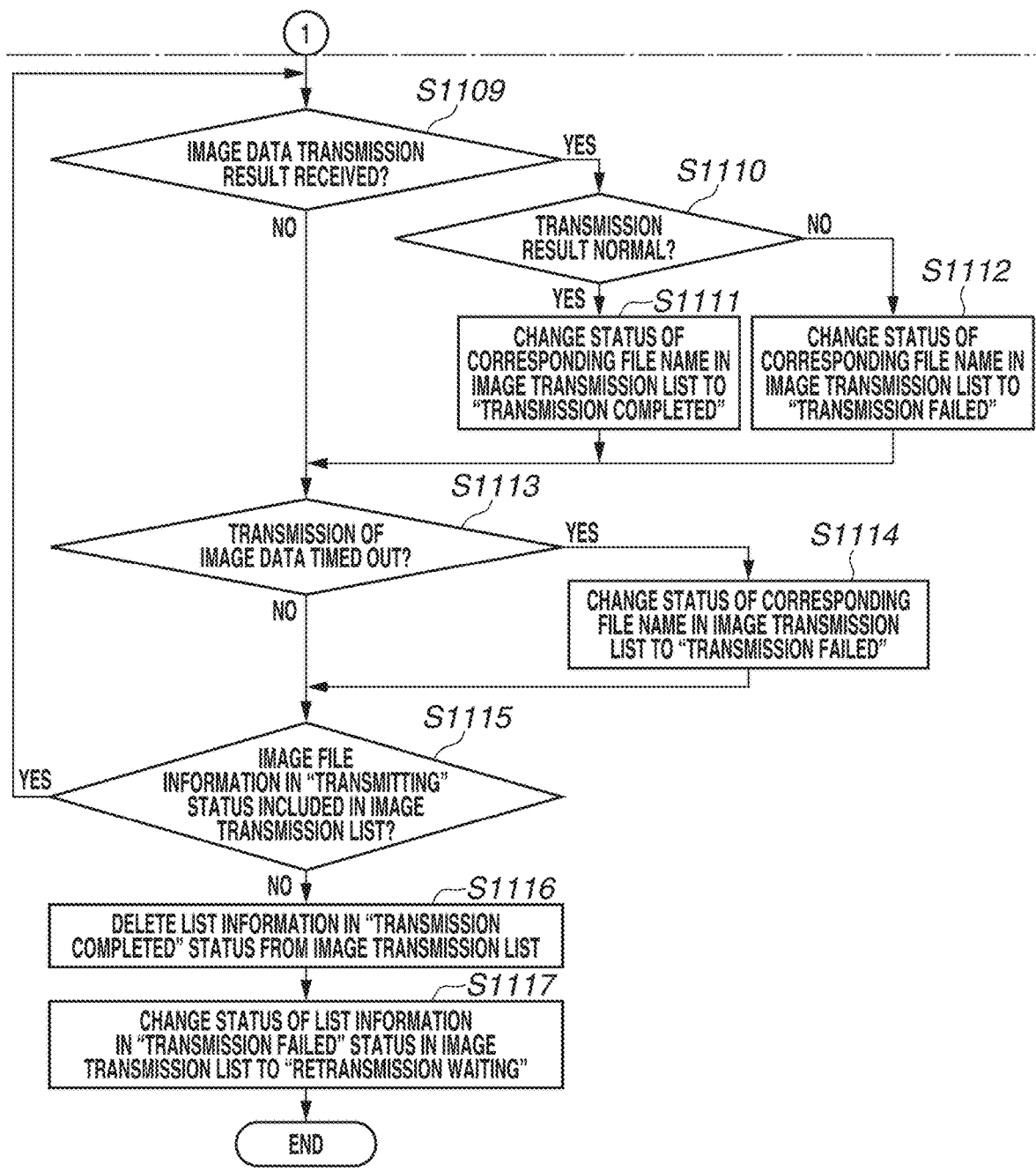

Hereinafter, the affected area image confirmation processing (step S427) will be described with reference to FIGS. 11A and 11B.

In step S1101, the system control unit 50 reads an image transmission list stored in the nonvolatile memory 56.

In step S1102, the system control unit 50 determines whether image file information in the "transmitting" status is included in the image transmission list acquired in step S1101. In a case where image file information in the "transmitting" status is included in the image transmission list (YES in step S1102), the processing proceeds to step S1103. In a case where image file information in the "transmitting" status is not included in the image transmission list (NO in step S1102), the processing ends.

In step S1103, the system control unit 50 displays the affected area image confirmation screen illustrated in FIG. 10.

In step S1104, the system control unit 50 determines whether the user has selected the cancel button 1005 on the affected area image confirmation screen. The selection is performed by a touching operation on the cancel button 1005 or a pressing operation on the SET button 75 in a state in which a selection frame is set on the cancel button 1005 by a dial operation or a cross key operation. In a case where the cancel button has been selected (YES in step S1104), the processing proceeds to step S1105. In a case where the cancel button has not been selected (NO in step S1104), the processing proceeds to step S1107.

In step S1105, the system control unit 50 transmits a cancel notification to the in-hospital system 1802 via the communication unit 54.

In step S1106, the system control unit 50 deletes, from the image transmission list stored in the nonvolatile memory 56, list information (image file information and status) that is in the "transmitting" status in the image transmission list.

In step S1107, the system control unit 50 determines whether the user has selected the OK button 1004 on the screen. The selection is performed by a touching operation on the OK button 1004 a pressing operation on the SET button 75 in a state in which a selection frame is set on the OK button 1004 by a dial operation or a cross key operation. In a case where the OK button 1004 has been selected (YES in step S1107), the processing proceeds to step S1108. In a case where the OK button 1004 has not been selected (NO in step S1107), the processing returns to step S1104.

In step S1108, the system control unit 50 transmits an OK notification to the in-hospital system 1802 via the communication unit 54.

In step S1109, the system control unit 50 determines whether a transmission result of the image data transmitted to the in-hospital system 1802 in step S904 has been received from the in-hospital system 1802. In a case where a transmission result of the image data has been received (YES in step S1109), the processing proceeds to step S1110. In a case where a transmission result has not been received (NO in step S1109), the processing proceeds to step S1113.

In step S1110, the system control unit 50 determines whether the image data transmission result received from the in-hospital system 1802 is normal. In a case where the transmission result is normal (YES in step S1110), the processing proceeds to step S1111. In a case where the transmission result is not normal (NO in step S1110), the processing proceeds to step S1112.

In step S1111, among pieces of image file information in the image transmission list stored in the nonvolatile memory 56, the system control unit 50 changes a status of image file information for which the transmission result has been received from the in-hospital system 1802, to "transmission completed".

In step S1112, among pieces of image file information in the image transmission list stored in the nonvolatile memory 56, the system control unit 50 changes a status corresponding to image file information for which the transmission result has been received from the in-hospital system 1802, to "transmission failed".

In step S1113, the system control unit 50 determines whether a transmission result has not been received from the in-hospital system 1802 for a certain period of time from when image data has been transmitted to the in-hospital system 1802 in step S904. In a case where the transmission has timed out (YES in step S1113), the processing proceeds to step S1114. In a case where the transmission has not timed out (NO in step S1113), the processing proceeds to step S1115.

In step S1114, among pieces of image file information in the image transmission list stored in the nonvolatile memory 56, the system control unit 50 changes a status of image file information for which the transmission result has not been received from the in-hospital system 1802, to "transmission failed".

In step S1115, the system control unit 50 determines whether list information in the "transmitting" status is included in the image transmission list. In a case where list information in the "transmitting" status is included (YES in step S1115), the processing returns to step S1109. In a case where list information in the "transmitting" status is not included (NO in step S1115), the processing proceeds to step S1116.

In step S1116, the system control unit 50 deletes list information that is in the "transmission completed" status, from the image transmission list stored in the nonvolatile memory 56.

In step S1117, the system control unit 50 changes a status of list information that is in the "transmission failed" status in the image transmission list stored in the nonvolatile memory 56, to "retransmission waiting".

In the above-described manner, in the affected area image confirmation processing, it is possible to check image data that has not been transmitted to the in-hospital system 1802, and it is also possible to cancel transmission of unsent image data. The processing in steps S1109 to S1117 is also executed in a case where image data (image file) transmission result from the in-hospital system 1802 is received, transmission time-out is occurred, and image data in the "transmitting" status is no more in the image transmission list, even when the affected area image retransmission processing is not executed. In other words, an image transmission list stored in the nonvolatile memory 56 is appropriately updated in accordance with a transmission status of image data.

<Affected Area Image Retransmission Processing>

FIGS. 12A to 12D each illustrate an example of a screen that is displayed in the affected area image retransmission processing.

Figure 12A:
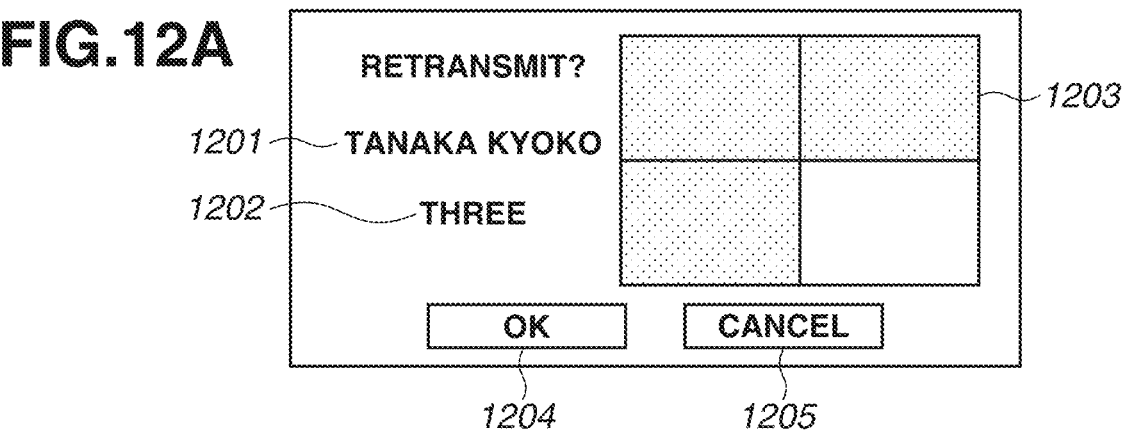
FIGS. 12A to 12D are diagrams each illustrating an example of a screen that is displayed in affected area image retransmission processing.

FIG. 12A illustrates a retransmission confirmation screen.

An item 1201 is patient information (patient name) associated with image data that is in the "retransmission waiting" status in the image transmission list. In a case where a plurality of pieces of image data in the "retransmission waiting" status exists, medical information associated with image data of an image captured first or last can be displayed, or medical information associated with all pieces of image data can be displayed.

An item 1202 displays the number of pieces of image data that are in the "retransmission waiting" status in the image transmission list.

An item 1203 is thumbnail images of image data that is in the "retransmission waiting" status in the image transmission list. In a case where a plurality of pieces of image data in the "retransmission waiting" status exists, a thumbnail image of image data of an image captured first or last can be displayed, or thumbnail images of all pieces of image data can be displayed as illustrated.

An OK button 1204 is used when the user selects OK after confirmation of whether to retransmit image data.

A cancel button 1205 is used when the user selects cancel after confirmation of whether to retransmit image data.

Figure 12B:
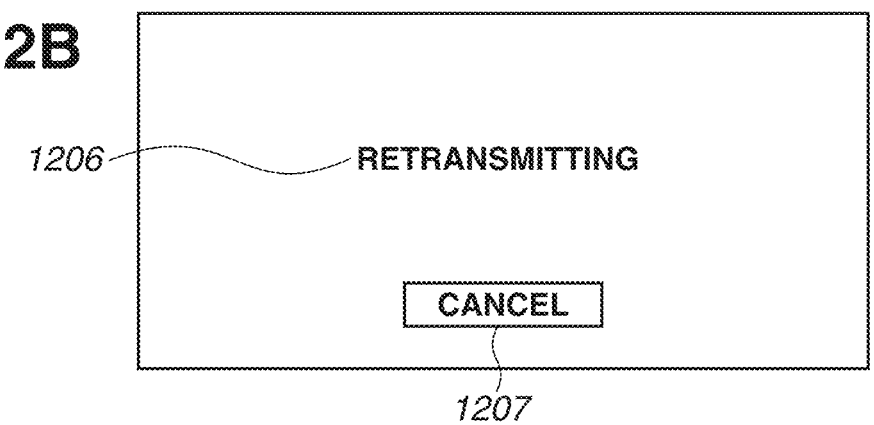

FIG. 12B illustrate a retransmitting screen.

On the retransmitting screen, a message 1206 notifying that image is being transmitted and a cancel button 1207 are displayed. The progress of the number of image data being transmitted out of pieces of image data can be displayed. A transmission stop instruction can be issued by operating the cancel button 1207.

Figure 12C:
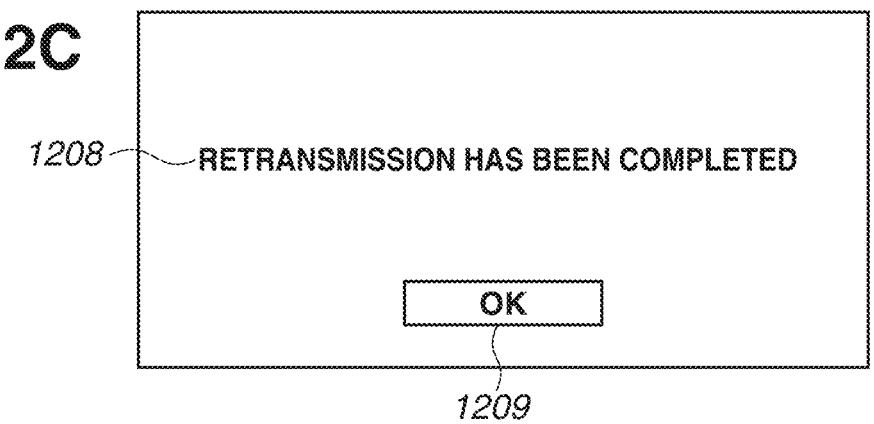

FIG. 12C is a retransmission success screen indicating that the retransmission has been properly performed.

On the retransmission success screen, a message 1208, notifying that the retransmission has succeeded, and an OK button 1209 are displayed.

Figure 12D:
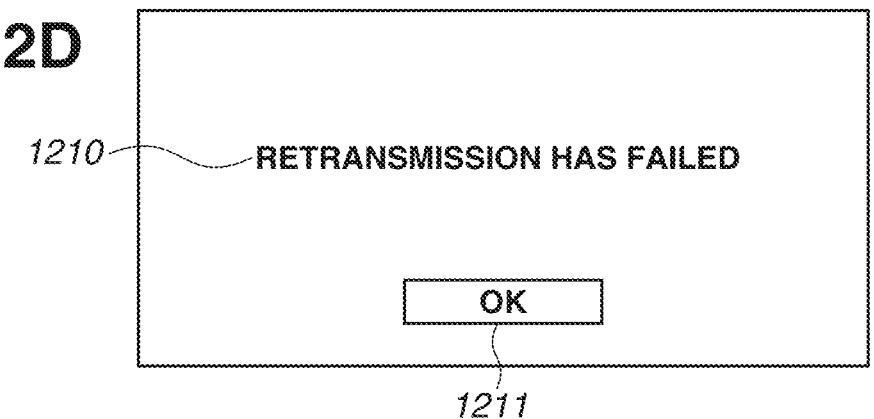

FIG. 12D is a retransmission failure screen notifying that retransmission has not been properly performed.

On the retransmission failure screen, a message 1210, notifying that the transmission has failed, and an OK button 1211 are displayed.

Figure 13:
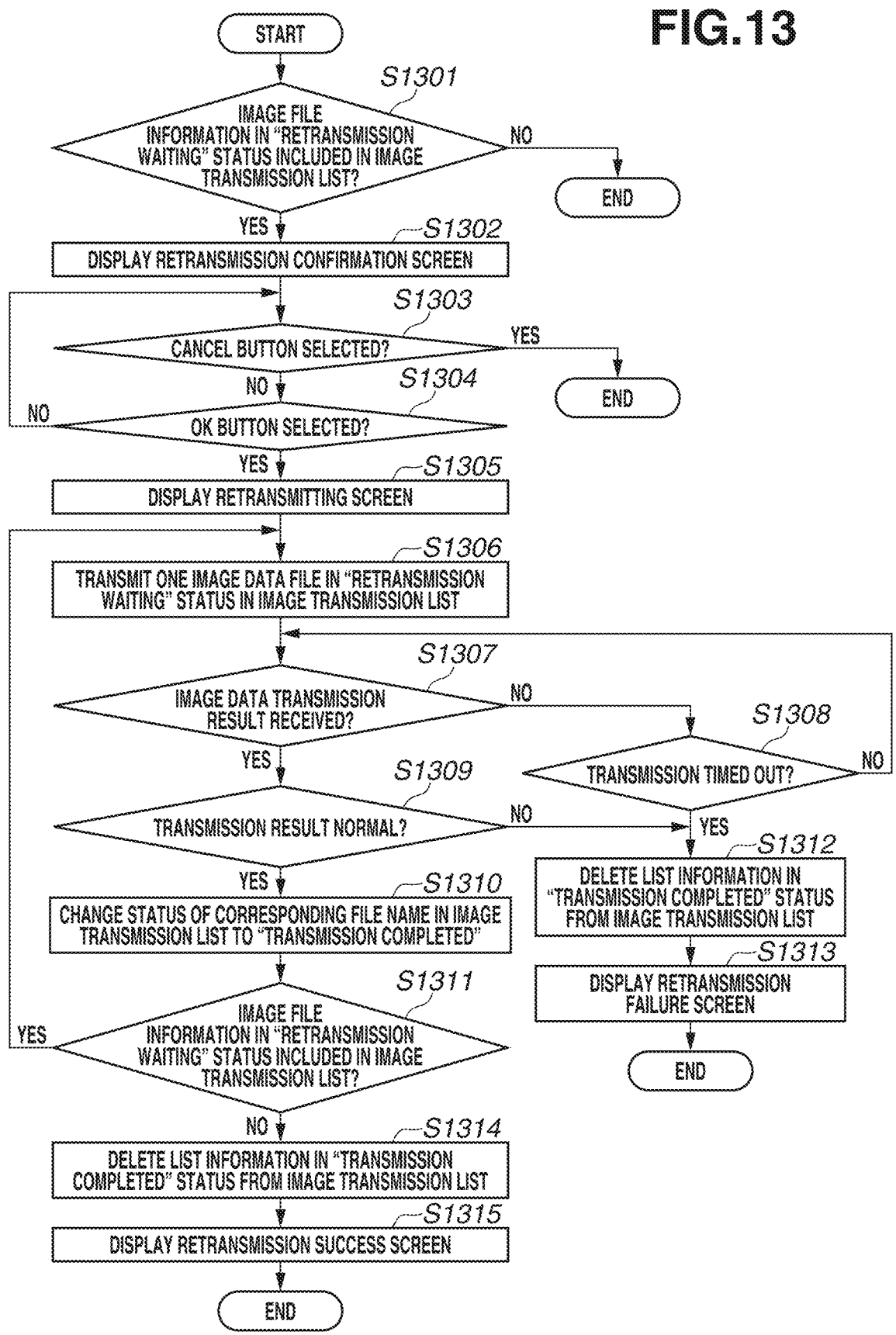
FIG. 13 is a flowchart of the affected area image retransmission processing.

Hereinafter, the affected area image retransmission processing (step S429) will be described with reference to FIG. 13.

In step S1301, the system control unit 50 determines whether list information in the "retransmission waiting" status is included in the image transmission list stored in the nonvolatile memory 56. In a case where list information in the "retransmission waiting" status is included in the image transmission list (YES in step S1301), the processing proceeds to step S1302. In a case where list information in the "retransmission waiting" status is not included in the image transmission list (NO in step S1301), the processing ends.

In step S1302, the system control unit 50 displays the retransmission confirmation screen illustrated in FIG. 12A.

In step S1303, the system control unit 50 determines whether the user has selected the cancel button 1205 on the screen. The selection is performed by a touching operation on the cancel button 1205 or a pressing operation on the SET button 75 in a state in which a selection frame is set on the cancel button 1205 by a dial operation or a cross key operation. In a case where the cancel button 1205 has been selected (YES in step S1303), the processing ends. In a case where the cancel button 1205 has not been selected (NO in step S1303), the processing proceeds to step S1304.

In step S1304, the system control unit 50 determines whether the user has selected the OK button 1204 on the screen. The selection is performed by a touching operation on the OK button 1204 or a pressing operation on the SET button 75 in a state in which a selection frame is set on the OK button 1204 by a dial operation or a cross key operation. In a case where the OK button 1204 has been selected (YES in step S1304), the processing proceeds to step S1305. In a case where the OK button 1204 has not been selected (NO in step S1304), the processing proceeds to step S1303.

In step S1305, the system control unit 50 displays the retransmitting screen illustrated in FIG. 12B.

In step S1306, the system control unit 50 transmits one image data file from among image data files that are in the "retransmission waiting" status in the image transmission list stored in the nonvolatile memory 56, to the in-hospital system 1802 via the communication unit 54. In a case of a configuration in which medical information associated with image data is data different from image data, data of the associated medical information is transmitted together.

In step S1307, the system control unit 50 determines whether a transmission result of image data transmitted to the in-hospital system 1802 in step S1306 has been received from the in-hospital system 1802. In a case where a transmission result has been received (YES in step S1307), the processing proceeds to step S1309. In a case where a transmission result has not been received (NO in step S1307), the processing proceeds to step S1308.

In step S1308, the system control unit 50 determines whether a transmission result has not been received from the in-hospital system 1802 for a certain period of time from when image data has been transmitted to the in-hospital system 1802 in step S1306. In a case where the transmission has timed out (YES in step S1308), the processing proceeds to step S1312. In a case where the transmission has not timed out (NO in step S1308), the processing returns to step S1307.

In step S1309, the system control unit 50 determines whether the transmission result received from the in-hospital system 1802 is normal. In a case where the transmission result is normal (YES in step S1309), the processing proceeds to step S1310. In a case where the transmission result is not normal (NO in step S1309), the processing proceeds to step S1312.

In step S1310, the system control unit 50 changes a status of image file information, for which the transmission result has been received from the in-hospital system 1802, in the image transmission list to "transmission completed".

In step S1311, the system control unit 50 determines whether list information in the "retransmission waiting" status is included in the image transmission list stored in the nonvolatile memory 56. In a case where list information in the "retransmission waiting" status is included in the image transmission list (YES in step S1311), the processing returns to step S1306. In a case where list information in the "retransmission waiting" status is not included in the image transmission list (NO in step S1311), the processing proceeds to step S1314.

In step S1312, the system control unit 50 deletes list information that is in the "transmission completed" status, from the image transmission list stored in the nonvolatile memory 56.

In step S1313, the system control unit 50 displays the retransmission failure screen illustrated in FIG. 12D.

In step S1314, the system control unit 50 deletes list information that is in the "transmission completed" status, from the image transmission list stored in the nonvolatile memory 56.

In step S1315, the system control unit 50 displays the retransmission success screen illustrated in FIG. 12C.

In the above-described manner, in the affected area image retransmission processing, unsent image data that is in the "retransmission waiting" status in the image transmission list can be retransmitted to the in-hospital system 1802.

<LV Display in Normal Image Capturing Mode>

As described above, in the medical mode, the LV display setting is switched between the imaging parameter display and the medical information display in accordance with an operation on the display switching button 83. In contrast to the configuration, in the normal image capturing mode (medical mode OFF), various LV display settings, such as ON/OFF of imaging parameter display, the type of imaging parameters to be displayed, ON/OFF of perpendicular display, and ON/OFF of live view display, can be switched in accordance with an operation on the display switching button 83. In the normal image capturing mode, the LV display setting is not switched to the medical information display even in a case where the display switching button 83 is operated.

In the medical mode, an imaging preparation operation, such as AF processing, AE processing, AWB processing, and EF processing, is executed in accordance with the first shutter switch signal SW1 (shutter button 61 half press), and by switching the LV display setting to the medical information display, the user is provided with medical information to perform a confirmation before affected area image capturing. In contrast to the configuration, in the normal image capturing mode, an imaging preparation operation is executed in accordance with the first shutter switch signal SW1, and the LV display is switched to LV display ON and display of specific imaging parameters (for example, AF frame (frame indicating an in-focus region), shutter speed, an aperture value). By hiding other imaging parameters and various types of information, a confirmation of live view and specific imaging parameters can be easily performed. For this reason, an imaging preparation operation can be executed before still image capturing in accordance with the second shutter switch signal SW2, and a live image captured after the imaging preparation operation can be confirmed, whereby it becomes possible to confirm imaging parameters important for still image capturing.

Other Example Embodiments

The above-described various types of control that are performed by the system control unit 50 can be performed by one piece of hardware. Alternatively, the entire apparatus can be controlled by a plurality of pieces of hardware (e.g., a plurality of processors or circuits) sharing the processing.

The example embodiments of the present invention have been described in detail, but the present invention is not limited to these specific example embodiments, and various configurations without departing from the scope of the invention are also included in the present invention. Furthermore, each of the above-described example embodiments merely indicates an example embodiment of the present invention, and the example embodiments can be appropriately combined.

In the above-described example embodiment, an example case where the present invention is applied to the imaging apparatus (digital camera) 100 has been described. An application example of the present invention is not limited to this example, and the present invention can be applied to any device including an imaging unit. More specifically, the present invention can be applied to a personal computer (PC), a personal digital assistance (PDA), a mobile phone terminal, a portable image viewer, a printer apparatus including a display, a digital photo frame, a music player, a game machine, and an electronic book reader.

An application example is not limited to an imaging apparatus main body, and the present invention can also be applied to a control apparatus that communicates with an imaging apparatus (including a network camera) via wired or wireless communication and remotely controls the imaging apparatus. Examples of the control apparatus that remotely controls the imaging apparatus include a smartphone, a tablet PC, and a desktop PC. By notifying commands for causing the imaging apparatus to perform various operations and settings, from the control apparatus based on operations performed by the control apparatus or processing performed by the control apparatus, the imaging apparatus can be remotely controlled. In addition, the control apparatus can receive a live view image captured by the imaging apparatus, via wired or wireless communication, and display the live view image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to example embodiments, it is to be understood that the invention is not limited to the disclosed example embodiments and is defined by the following claims. The scope of the following claims is to be accorded the broadest interpretation so as to encompass all such modifications and equivalent structures and functions.

This application claims the benefit of Japanese Patent Application No. 2021-191534, filed Nov. 25, 2021, which is hereby incorporated by reference herein in its entirety.

What is claimed is:

1. An imaging apparatus comprising:
an operation member;
a memory and at least one processor which function as:
a setting unit configured to set the operation member to an enabled state or a disabled state;
a switching unit configured to switch an image capturing mode to a medical mode in which the imaging apparatus is used for capturing an image of an affected area of a patient in a medical workplace; and
a control unit configured to perform, in a case where the image capturing mode is not the medical mode, control to allow the setting unit to set the operation member to the enabled state or the disabled state, and perform, in a case where the image capturing mode is the medical mode, control to set the operation member to the enabled state.

2. The imaging apparatus according to claim 1, wherein the control unit performs, in a case where the image capturing mode is the medical mode, control to not allow the setting unit to set the operation member to the disabled state.

3. The imaging apparatus according to claim 1, wherein the control unit performs control to set the operation member to the enabled state, in accordance with the image capturing mode being switched to the medical mode.

4. The imaging apparatus according to claim 1,
wherein the setting unit is able to set a function to be executed in response to the operation member being operated, and
wherein, in a case where a function to be executed in response to the operation member being operated is not set by the setting unit, the operation member is set to the disabled state.

5. The imaging apparatus according to claim 4,
wherein the operation member is an operation member to which a function related to focus is able to be allocated, and
wherein the setting unit is able to allocate a function for focus position selection to the operation member.

6. The imaging apparatus according to claim 5, wherein the operation member is an operation member on which operations in a plurality of directions and a push operation are able to be performed.

7. The imaging apparatus according to claim 6, wherein the operation member is an operation member that detects operations in the plurality of directions using infrared rays.

8. The imaging apparatus according to claim 1, wherein the setting unit collectively switches between the enabled state and the disabled state of a plurality of operation members.

9. The imaging apparatus according to claim 8, wherein, in a case where the image capturing mode is switched to the medical mode, the control unit performs control to collectively set the plurality of operation members to the enabled state.

10. The imaging apparatus according to claim 8, wherein the setting unit switches between the enabled state and the disabled state of the plurality of operation members in accordance with an operation on a specific operation member different from the plurality of operation members.

11. The imaging apparatus according to claim 10, wherein, in a case where the image capturing mode is the medical mode, the control unit performs control to invalidate an operation on the specific operation member.

12. The imaging apparatus according to claim 1, wherein the medical mode is a mode in which the image of the affected area captured by the imaging apparatus in a medical workplace is recorded in association with medical information.

13. The imaging apparatus according to claim 12, further comprising a communication unit,
wherein the medical mode is a mode in which the image of the affected area captured by the imaging apparatus is recorded in association with medical information acquired from a system of a hospital via the communication unit.

14. The imaging apparatus according to claim 12, wherein the medical information includes at least one of patient information, region information about the affected area and information about a doctor or a nurse.

15. The imaging apparatus according to claim 12, wherein, in the medical mode, the medical information is acquired via the communication unit based on a barcode image captured by the imaging apparatus.

16. A control method of an imaging apparatus including an operation member, the control method comprising:
setting the operation member to an enabled state or a disabled state;
switching an image capturing mode between a medical mode in which the imaging apparatus is used for capturing an image of an affected area of a patient in a medical workplace and a mode that is not the medical mode; and
performing, in a case where the image capturing mode is not the medical mode, control to allow the setting to set the operation member to the enabled state or the disabled state and performing, in a case where the image capturing mode is the medical mode, control to set the operation member to the enabled state.

17. A non-transitory computer-readable storage medium storing a program for causing a computer to execute the control method of the imaging apparatus according to claim 16.

* * * * *